(12) United States Patent
Bi et al.

(10) Patent No.: US 7,112,449 B1
(45) Date of Patent: Sep. 26, 2006

(54) COMBINATORIAL CHEMICAL SYNTHESIS

(75) Inventors: Xiangxin Bi, San Ramon, CA (US); Sujeet Kumar, Fremont, CA (US); Craig R. Horne, San Francisco, CA (US); Ronald J. Mosso, Fremont, CA (US); James T. Gardner, Cupertino, CA (US); Shivkumar Chiruvolo, Sunnyvale, CA (US); Seung M. Lim, Livermore, CA (US)

(73) Assignee: NanoGram Corporation, San Jose, CA (US)

( * ) Notice: Subject to any disclaimer, the term of this patent is extended or adjusted under 35 U.S.C. 154(b) by 0 days.

(21) Appl. No.: 09/557,696

(22) Filed: Apr. 25, 2000

Related U.S. Application Data

(60) Provisional application No. 60/194,734, filed on Apr. 5, 2000.

(51) Int. Cl.
| | |
|---|---|
| G01N 1/10 | (2006.01) |
| B32B 27/04 | (2006.01) |
| B32B 27/12 | (2006.01) |
| B32B 5/02 | (2006.01) |
| B32B 27/38 | (2006.01) |

(52) U.S. Cl. ............ 436/180; 422/134; 422/149; 422/152; 422/156

(58) Field of Classification Search ............ 436/50, 436/55, 180, 174, 178; 73/864.11, 864.12, 73/864.18, 864.22, 864.23, 864.24, 864.25; 141/250, 270, 283; 422/100, 134, 152, 149, 422/156, 105
See application file for complete search history.

(56) References Cited

U.S. PATENT DOCUMENTS 4,158,545 A * 6/1979 Yamashita et al. ........ 23/230 R (Continued)

FOREIGN PATENT DOCUMENTS

DE 2250274 A1 4/1974

(Continued)

OTHER PUBLICATIONS

International Search Report dated Jul. 17, 2001 for International Application No. PCT/US01/10673.

*Primary Examiner*—Jill Warden
*Assistant Examiner*—Brian R. Gordon
(74) *Attorney, Agent, or Firm*—Patterson, Thuente, Skaar & Christensen, P.A.; Peter S. Dardi

(57) ABSTRACT

Combinatorial synthesis methods obtain a plurality of compositions having materially different characteristics using an apparatus having a plurality of collectors. A first quantity of fluid reactants are reacted to form a first quantity of product composition. Following completion of the collection of the first quantity of product composition, a second quantity of fluid reactants are reacted to form a second quantity of product composition, the second quantity of product composition being material different from the first quantity of product composition. An apparatus includes a nozzle connected to a reactant source and a plurality of collectors. The nozzle and plurality of collectors move relative to each other such that a collector can be selectively placed to receive a fluid stream emanating from the nozzle. The plurality of product compositions can be evaluated to determine their suitability for various applications.

47 Claims, 10 Drawing Sheets

U.S. PATENT DOCUMENTS

| | | | |
|---|---|---|---|
| 4,649,037 A * | 3/1987 | Marsh et al. | |
| 4,746,490 A * | 5/1988 | Saneii | 422/62 |
| 5,104,808 A * | 4/1992 | Laska et al. | 436/48 |
| 5,254,311 A * | 10/1993 | Ushikubo | 422/100 |
| 5,320,966 A * | 6/1994 | Mitsumaki et al. | 436/47 |
| 5,366,897 A * | 11/1994 | Hager et al. | 436/55 |
| 5,400,836 A * | 3/1995 | Divall | 141/1 |
| 5,609,921 A | 3/1997 | Gitzhofer et al. | 427/446 |
| 5,652,083 A | 7/1997 | Kumar et al. | 430/315 |
| 5,654,797 A | 8/1997 | Moreau et al. | 356/336 |
| 5,660,792 A * | 8/1997 | Koike | 422/63 |
| 5,668,014 A * | 9/1997 | Aoki et al. | 436/110 |
| 5,686,791 A | 11/1997 | Kumar et al. | 313/495 |
| 5,744,305 A | 4/1998 | Fodor et al. | 435/6 |
| 5,773,662 A * | 6/1998 | Imai et al. | 436/50 |
| 5,776,359 A | 7/1998 | Schultz et al. | 252/62.51 |
| 5,814,700 A * | 9/1998 | Brennan | 525/54.11 |
| 5,874,134 A | 2/1999 | Rao et al. | 427/466 |
| 5,958,348 A | 9/1999 | Bi et al. | 422/186.04 |
| 5,959,297 A | 9/1999 | Weinberg et al. | 250/288 |
| 5,971,041 A * | 10/1999 | Drewitz | 141/135 |
| 5,985,356 A | 11/1999 | Schultz et al. | 427/8 |
| 6,000,445 A * | 12/1999 | Schuh | 141/83 |
| 6,001,311 A * | 12/1999 | Brennan | 422/131 |
| 6,006,800 A * | 12/1999 | Nakano | 141/130 |
| 6,033,911 A * | 3/2000 | Schultz et al. | 422/100 |
| 6,096,561 A * | 8/2000 | Tayi | 436/518 |
| RE37,194 E * | 5/2001 | Kirk | 205/335 |
| 6,254,826 B1 * | 7/2001 | Acosta et al. | 422/100 |
| 6,265,226 B1 * | 7/2001 | Petro et al. | 436/180 |
| 6,696,298 B1 * | 2/2004 | Cook et al. | 436/54 |

FOREIGN PATENT DOCUMENTS

| | | |
|---|---|---|
| JP | 61-67836 | 5/1986 |
| WO | WO 98/06490 A1 | 2/1998 |
| WO | WO 98/39099 A1 | 9/1998 |
| WO | WO 98/57181 A1 | 12/1998 |
| WO | WO 99/30817 | 6/1999 |
| WO | WO 00/00312 | 1/2000 |
| WO | WO 01/58962 A1 | 8/2001 |

* cited by examiner

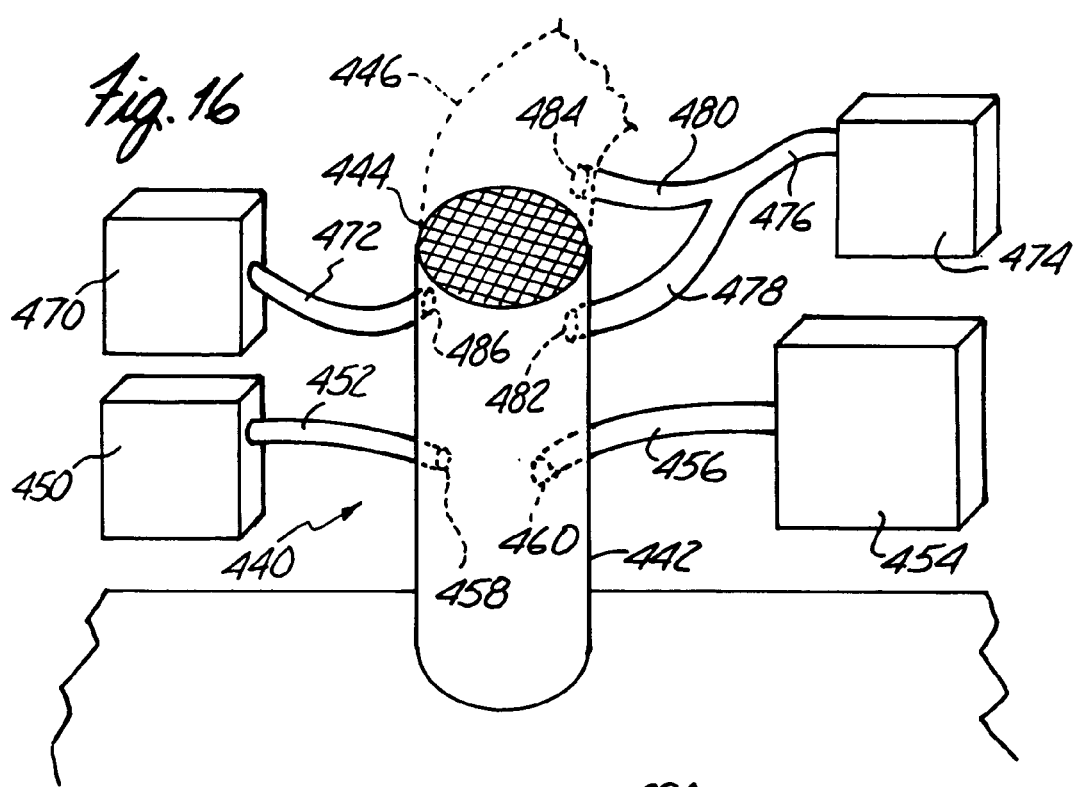
Fig. 16
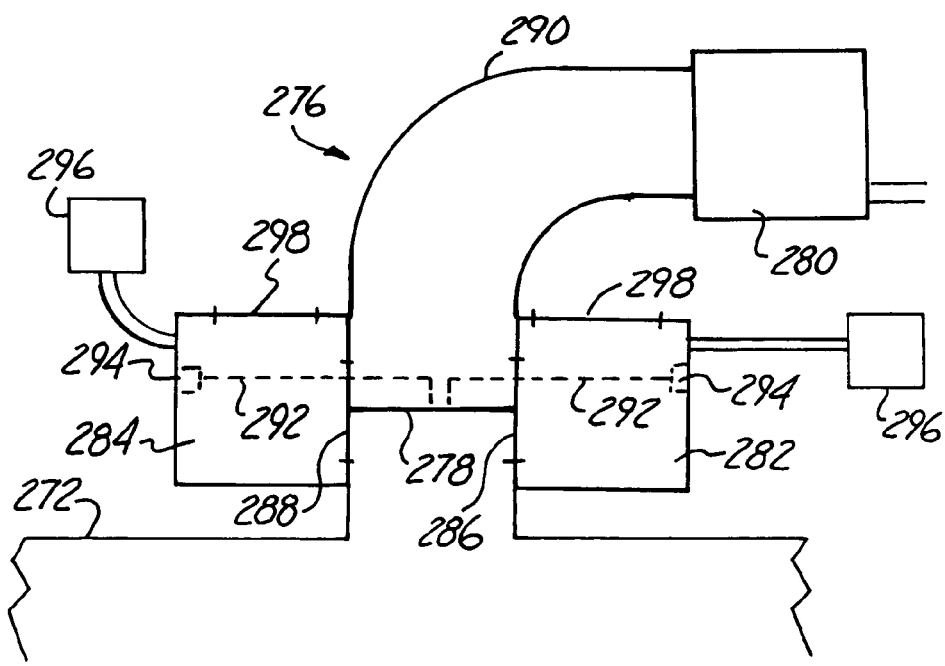
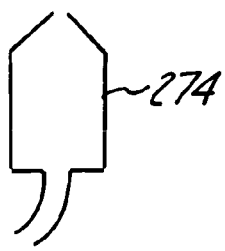
Fig. 11

COMBINATORIAL CHEMICAL SYNTHESIS

CROSS REFERENCE TO RELATED APPLICATIONS

This application claims priority to U.S. Provisional Patent Application Ser. No. 60/194,734 filed Apr. 5, 2000 to Bi et al., entitled "Combinatorial Chemical Synthesis," incorporated herein by reference.

FIELD OF THE INVENTION

The invention relates to the production of chemical compositions, in particular solid particles, with a range of particle properties. Furthermore, the invention relates to the evaluation of the properties of a plurality of quantities of chemical compositions following combinatorial chemical synthesis.

BACKGROUND OF THE INVENTION

Technological advances have increased the demand for advanced materials processed with strict tolerances on processing parameters. In particular, the development of new products, such as products with miniaturized components, have created a demand for many types of new materials, especially advanced inorganic materials, for use in advanced processing methods. To meet some of these demands, a variety of chemical powders can be used in many different processing contexts. Specifically, there is considerable interest in the application of ultrafine powders that are particularly advantageous for a variety of applications involving small structures or high surface area materials. This demand for ultrafine chemical powders has resulted in the development of sophisticated techniques, such as laser pyrolysis, for the production of these powders.

Ceramic powders, especially powders including metal or silicon compounds, are of interest for a range of different applications. For example, chemical powders can be used in the production of electronic devices, such as batteries, catalysts, resistors, capacitors, inductors and transistors, and optical devices, such as wave guides, optical switches and nonlinear optical devices. Other specific electronic devices include electronic displays, which often use phosphor material that emit visible light in response to interaction with electrons. Similarly, ceramic powders can be useful in the production of coatings within microelectronic devices or coatings for electromagnetic shielding. The use of chemical powders for various applications requires specific processing approaches in order to place the powders in a suitable form for the application. For many of these applications ultrafine powders can be used advantageously.

The performance of the powders in the respective applications generally depend on one or more of 1) chemical composition, 2) crystalline phase, 3) surface properties, 4) average particle size and 5) particle size distribution. For example, major functional attributes of electroactive compounds in a lithium ion battery cathode that depend on the electroactive particle properties may include, for example, voltage profile, charge and discharge capacity, charge and discharge rate, and power capability.

Rapid material synthesis or combinatorial approaches have found success in the area of organic compound evaluation. These techniques have been used for drug design. Generalization of combinatorial techniques have resulted in solid state reaction methods for producing small quantities of inorganic materials for evaluation.

SUMMARY OF THE INVENTION

In a first aspect, the invention pertains to a method for obtaining a plurality of quantities of compositions with an apparatus comprising a plurality of collectors. The method includes the reaction of a first quantity of fluid reactants to form a first quantity of product composition. The first quantity of product composition is collected using a first collector. Following completion of the collection of the first quantity of product composition, a second quantity of fluid reactants are reacted to form a second quantity of product composition, the second quantity of product composition being materially different from the first quantity of product composition. The second quantity of product composition is collected using a second collector.

In another aspect, the invention pertains to an apparatus comprising a nozzle connected to a reactant source and a plurality of collectors. The nozzle and the plurality of collectors move relative to each other such that a collector can be selectively placed to receive a fluid stream emanating from the nozzle. Each collector comprising a gas permeable membrane.

In a further aspect, the invention pertains to an apparatus comprising a nozzle connected to a reactant source, a plurality of collectors and a product composition within a fluid stream emanating from the nozzle. The nozzle and the plurality of collectors move relative to each other such that a collector can be selectively placed to receive the fluid stream.

In an additional aspect, the invention pertains to a method for the rapid evaluation of the properties of particles. The method includes collecting a plurality of quantities of particles wherein each quantity of particles is collected using a separate particle collector comprising a gas permeable membrane. The method further includes evaluating a property of each quantity of particles with the particles in contact with the gas permeable membrane.

In addition, the invention pertains to a method for obtaining a mixture of compositions. The method includes the reaction of a first quantity of fluid reactants to form a first quantity of product composition. The first quantity of product composition is collected using a collector. Following completion of the collection of the first quantity of product composition, a second quantity of fluid reactants are reacted to form a second quantity of product composition, the second quantity of product composition being materially different from the first quantity of product composition. The second quantity of product composition is collected using the collector.

BRIEF DESCRIPTION OF THE DRAWINGS

FIG. 11 is a schematic, cut-away side view of a synthesis system with a collector that has locking chambers to insert and remove collectors without disturbing the synthesis system being maintained at non-atmospheric pressures.

FIG. 16 is a schematic view of a collector configured for various optical measurements, in which hidden ports and a connection to a pump are shown in phantom lines.

DETAILED DESCRIPTION OF THE ILLUSTRATIVE EMBODIMENTS

Combinatorial chemical synthesis, i.e., rapid material synthesis, approaches have been developed for the production of a plurality of measurable quantities of chemical compositions using reactions within a fluid stream. The particle production apparatus includes a plurality of collectors for separately collecting quantities of chemical powders with materially different characteristics. The particles with materially different characteristics are formed by changing the parameters of the reaction at different points in time. Thus, distinct batches of particles are produced sequentially and collected separately in different collectors. In preferred embodiments, the particles are evaluated without separating the particles from the particle collector.

Figure 1:
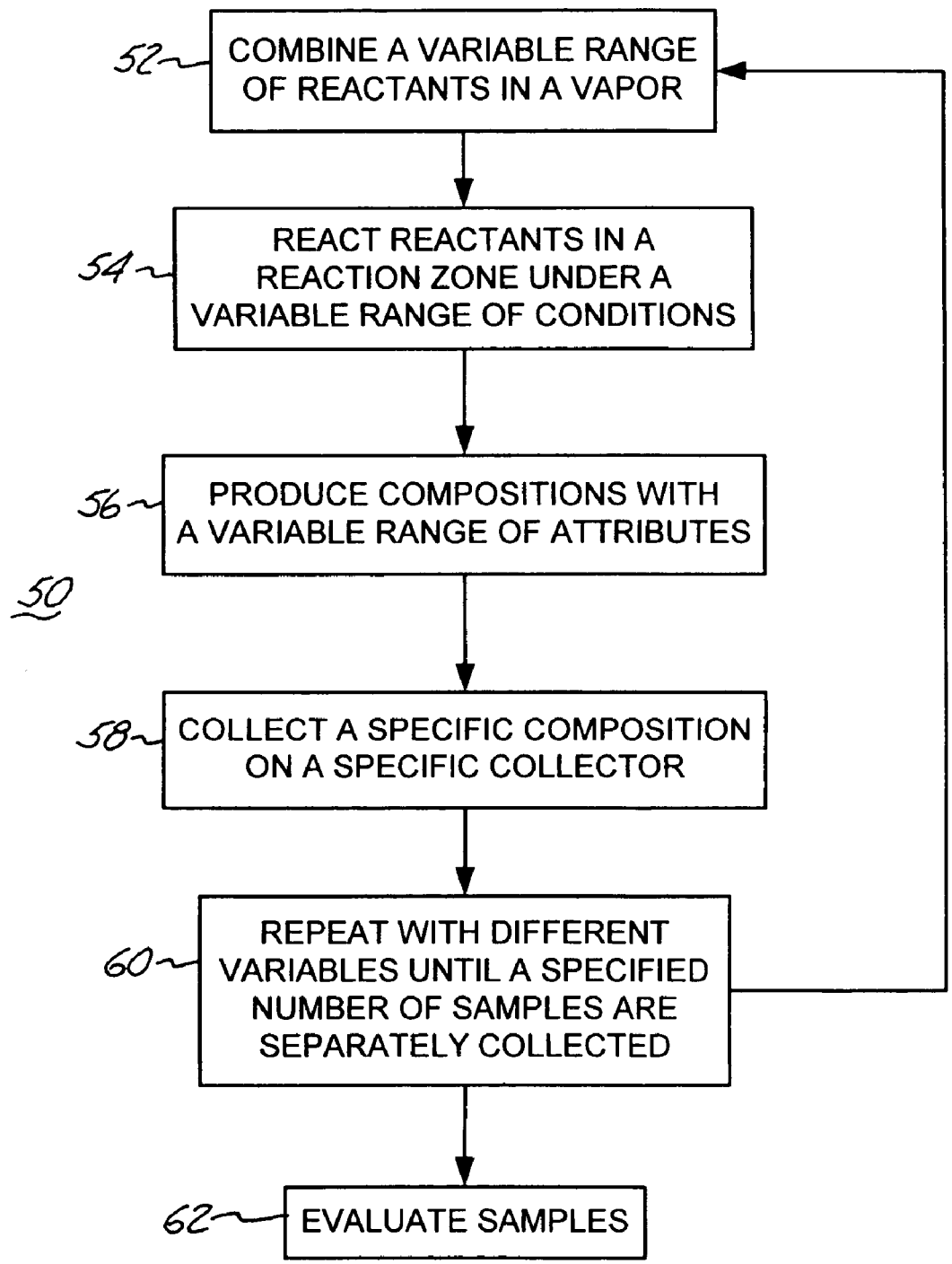
FIG. 1 is a block diagram outline the combinatorial synthesis approach described herein.

Referring to FIG. 1, a block diagram depicting the combinatorial synthesis approach described herein is presented. Process 50 involves combining 52 a variable mix of reactant in a fluid form. Then, the fluid reactants are reacted 54 within a reaction zone under a variable range of reaction conditions. The reactions produce 56 compositions with a variable range of attributes. A specific composition produced with a selected mix of reactants produced under selected reaction conditions are collected 58 in a specific collector. The process of producing and collecting specific compositions is repeated 60 with an alternative selected mix of reactants and/or under alternative selected reaction conditions. The synthesis process is repeated until specified number of samples are separately collected. The samples are evaluated 62 in order to identified product compositions with desired characteristics.

The apparatuses of interest have a source of fluid reactants and a collection system with a plurality of particle collectors. The fluid reactants are reacted in the fluid stream to produce particles within the fluid stream. Generally, the fluid reactants are supplied through a nozzle. The fluid can include gas and/or aerosols. The nozzle and the array of particle collectors preferably move relative to each other such that particles with materially different properties can be produced sequentially and separately collected for analysis. The chemical particles can then be evaluated for properties of interest.

Force of the reactant stream can propel reactants to a reactions zone with remaining momentum carrying the product composition to a collector. Therefore, a reaction chamber to confine the reaction is not needed. However, in preferred embodiments, the reaction of the fluid stream takes place within a reaction chamber. The reaction chamber can be sealed from the ambient environment, and a pump can be used to maintain the flow of fluid reactants through the chamber. In alternative embodiments, the reaction chamber is approximately at atmospheric pressure, and the reactant injection maintains fluid flow to the collectors. The nozzle, the collector or both can move relative to the reaction chamber to selectively collect quantities of product particles.

Furthermore, in preferred embodiments, the particle collector includes a gas permeable membrane that functions as a phase separator that removes the chemical compositions, preferably solids, from the fluid flow. Liquid or solid, i.e., particulate, product compositions can be collected using an appropriately designed collector. In some embodiments, gas flows from the inlet nozzle through the gas permeable membranes. The membranes can be selectively or individually connected to a pump that maintains the flow through the selected collector, or each membrane can be connected to a separate pump.

The chemical reaction can be based on a variety of fluid stream reaction approaches. In particular, the reaction can be based on electromagnetic energy (e.g., laser) pyrolysis, flame synthesis, spontaneous chemical reaction, thermal pyrolysis, and electric arc pyrolysis. All of these approaches involve a flow of fluid reactants that produce particles within the fluid stream upon reaction. The particle collectors harvest the particles from the fluid stream.

For the production of highly uniform particles, laser pyrolysis is a preferred synthesis approach since a very well defined reaction zone results in a highly uniform product. In laser pyrolysis, the conditions within the reaction zone are strongly influenced by the focused electromagnetic radiation. The conditions within the reaction zone are highly uniform, and the reaction conditions are highly adjustable. With laser pyrolysis, the reaction does not rely on the exothermicity or other aspects of the reaction to drive the reaction and maintain the conditions within the reaction zone. Thus, the reaction conditions can be carefully controlled to select properties of the product materials, such as, the average particle size, particle size distribution and crystalline phase.

In laser pyrolysis, a focused beam of electromagnetic radiation is directed through the reaction chamber to drive the reaction and the production of product particles. The focused energy beam creates a well defined reaction zone, and the product particles are rapidly quenched upon leaving the reaction zone. The fluid reactant stream includes one or more gaseous or aerosol reactant precursors that contribute atoms to the product compositions. The fluid reactant stream can include other compositions, such as, energy absorbers, solvents and inert gas moderators.

A plurality of particle collectors are used to separately collect quantities of particles with materially different properties. The particle collectors act as phase separators such that product particles are removed from a fluid stream. In preferred embodiments, the collectors include a gas permeable membrane such that the particles are trapped in the membrane while gases pass through the membrane. If the reaction chamber is sealed from the ambient environment, the apparatus is configured to pump the chamber through the membrane of a particular particle collector to collect desired product particles at a particular time in a particular collector.

Thus, a plurality of quantities of particles are collected sequentially with at least some sequentially collected quantities having materially different characteristics from other separately collected quantities of particles. In addition to the sequential collection, a plurality of quantities of particles can be collected in parallel using a plurality of reactant nozzles. In some embodiments, control of fluid flow can be used to direct product particles to a selected collector without physically moving the reactant inlets or the particle collectors. Alternatively, to collect sequentially the plurality of quantities of different particles, the reactant nozzle and the collectors are moved relative to each other. To provide the relative motion, the nozzle can be fixed relative to a reaction chamber or mount while the collectors move relative to the reaction chamber, or the collectors can be fixed relative to the reaction chamber while the nozzle moves relative to the reaction chamber, or both the nozzle and collectors can move relative to the reaction chamber.

Between the collection of one quantity of product particles and a subsequent quantity of product particles, a material reaction parameter is changed such that the subsequently and separately collected particles are materially different. Material reaction parameters include, for example, reactant composition, reactant flux, inert diluent concentration, reaction pressure, temperature, radiation wavelength, and radiation intensity. Any particles produced during the period of transition during which the reaction parameters are varying between an initial set of values and new values can be directed optionally to a waste collector.

Following collection of a particular quantity of particles, the particles can be subjected optionally to additional processing, and/or the properties of the particles are evaluated. In some embodiments, particle evaluation and any additional processing is performed without separating the particles from the collector. However, the collector can be removed from the reaction chamber to perform the additional processing and/or particle evaluation without separating the particles from the collector membrane. While it may be desirable to perform at least an initial evaluation without removing the particles from the collector membrane, samples that have desirable properties based on a partial evaluation can be removed from the collector for more extensive evaluation. Furthermore, in some embodiments, the samples can be efficiently and systematically processed, optionally using an automated system, to remove, optionally process, and evaluate the products.

If the particles are additionally processed and/or evaluated in the collector, a large number of samples can be efficiently and rapidly handled. If the particles are left in the synthesis apparatus, the synthesis apparatus can be adapted for parallel processing of the samples, and some of the manipulations may be possible while the synthesis continues. Alternatively, the set of collectors can be removed for further processing, preferably in parallel. Commercially available chemical sample collectors, automated dispensing systems, robotic systems and the like can be adapted for parallel processing of the samples. Additional processing can involve, for example, heat treatment in an inert or reactive environment and/or combining the compositions with additional compositions. Suitable properties for initial evaluation of the materials include, for example, crystal structure by x-ray diffraction, surface area (e.g., BET surface area), spectrographic properties, electronic properties, magnetic properties and chemical composition.

Using the combinatorial chemical synthesis approaches described herein, a significant number of samples can be prepared and evaluated to optimize reaction parameters to obtain desirable product particle characteristics. One or more reaction parameters can be varied systematically during a particular run to collect a set of quantities of product particles. Based on particle characteristic evaluation of particles produced in one run, several iterations of parameter variation can be performed to obtain highly optimized particles within a highly specific range of reaction parameters. These properties and particles can form the basis for the scale up to produce commercial quantities of the materials.

Preferred product particles are solid inorganic materials. The product particles can comprise, for example, elemental metal, alloys, elemental carbon, and metal/metalloid compounds, such as, metal/metalloid oxides, metal/metalloid nitrides, metal/metalloid carbides, metal/metalloid sulfides and combinations thereof. Metalloids are elements that exhibit chemical properties intermediate between or inclusive of metals and nonmetals. Metalloid elements include silicon, boron, arsenic, antimony, and tellurium. These particles can be used in a variety of applications, such as, electronics fabrication, surface polishing and coatings.

Particle Production

The combinatorial synthesis approaches herein involve fluid reactants that react to form product particles within the fluid stream. The particle collectors function as phase separators that remove at least a significant fraction of the particles from the fluid flow. Quantities of particles are produced sequentially, in which different separately collected quantities of particles have materially different characteristics from one or more other separately collected quantities of product particles. The batches of particles are separately collected using different particle collectors.

By forming the products within a fluid flow, product particles are formed which generally are collected as a powder. The quantity of particles collected depends on the production rate and the time allocated for collection of particles with a particular characteristic. In particular, efficient laser pyrolysis apparatuses have been developed to produce chemical powders at rates on the order of one kilogram per hour. See, for example, U.S. Pat. No. 5,958,348 to Bi et al., entitled "Efficient Production of Particles by Chemical Reaction," incorporated herein by reference. While particularly large production rates are not necessarily needed for combinatorial chemical synthesis, readily obtainable moderate laser pyrolysis production rates on the order of 10 grams per hour can be used to obtain 100 one gram samples in a ten hour period or one thousand 0.1 gram samples in a ten hour period. Small samples are sufficient for many analytical techniques. If even smaller samples are sufficient, even more samples can be produced in a given period of time.

Thus, using a fluid stream reaction approach contrasts with thin layer approaches in that larger samples can be efficiently produced and that product particles provide additional features such as particle sizes, shapes and distribution of sizes that can be examined for their effect. In addition, laser pyrolysis and other focused energy synthesis approaches can produce metastable phases due to the rapid quenching of the materials. If desired, the metastable compositions can be annealed to the equilibrium phase with a subsequent heat treatment. In contrast, thin layer solid phase combinatorial synthesis approaches are described in U.S. Pat. No. 5,985,356 to Schultz et al., entitled "Combinatorial Synthesis of Novel Materials," incorporated herein by reference. In the thin film solid phase reaction approach, products are produced in solid phase reactions to produce equilibrium products at isolated locations on a substrate.

Another advantage of the fluid stream synthesis approach is that the product compositions are formed separate from the collector so that strong association between the compositions and the collector does not usually take place. Therefore, the product compositions can be separated from the collector and placed in contact with a suitable substrate for further processing and/or analysis. For example, the product can be placed in contact with an $Al_2O_3$ boat for processing at temperatures up to a thousand degrees centigrade or a graphite boat for processing at even higher temperatures. Similarly, the product particles can be transferred to substrates for transmission electron micrograph analysis or x-ray diffraction analysis.

In the fluid stream reaction approach described herein, one or more reactants are provided as a gas, a vapor and/or aerosol within the fluid flow. Suitable reactants supply the atoms that are formed into the product compositions upon reaction in the fluid stream. If there is a single reactant, the reaction product results from decomposition, fragmentation or rearrangement of the reactant. If there are a plurality of reactants, each reactant contributes one or more atoms to the product composition. The fluid flow can include other, vapor, gaseous or aerosol compounds that may act as oxidizing agents, reducing agents, carrier gases, radiation absorbing compounds, reaction initiators, catalysts, diluents/moderators and the like. Some compounds within the reactant stream can have several different functions.

Suitable oxidizing agents include, for example, $O_2$, $O_3$, and CO. Molecular oxygen can be supplied as air. Suitable reducing agents include, for example, ammonia, $H_2$ and hydrocarbons. Inert carrier gasses include, for example, argon, helium and $N_2$. Other functional gases can also serve as carrier gases. Suitable radiation absorbing compounds depend on the radiation frequency. For infrared radiation supplied by a $CO_2$ laser, $C_2H_4$ is a suitable radiation absorbing gas. Reaction initiators include appropriate highly reactive species, and some oxidizing agents and/or reducing agents may function as reaction initiators. A variety of materials can function as catalysts, including metal particles and metal oxide particles. The catalysts can be supplied in the reactant stream or produced in situ along with the desired product particles. Inert gases can also be used as reaction moderators or diluents to decrease the intensity and rate of reaction and to adjust product particle characteristics.

Suitable combinatorial reaction systems can operate at atmospheric pressures with or without a reaction chamber to segregate the synthesis reaction. In preferred embodiments, a pump connected to the collection apparatus is used to maintain the fluid flow within a reaction chamber, which is sealed from the ambient environment. While the reaction chamber generally is operated at pressures less than atmospheric, pressures higher than atmospheric can be used for some synthesis approaches. In these embodiments, the particle collectors preferably include a gas permeable membrane separating the reaction chamber from the pump such that the pump maintains the fluid flow through the gas permeable membrane. In alternative embodiments, the reaction chamber is operated at near atmospheric pressure without a pump in which the reactant injection under pressure provides fluid flow through the system.

The present combinatorial synthesis approaches can be used with any flowing fluid reaction system. Suitable reaction systems can be based on, for example, spontaneous chemical reaction, flame synthesis, thermal pyrolysis, electric arc pyrolysis, and electromagnetic energy (laser) pyrolysis.

In spontaneous chemical reactions, the reactants are mixed within the reaction chamber, preferably by using two or more reactant inlets mounted on a nozzle such that fluid reactants flowing from each nozzle mix within the reaction chamber as they form a reactant flow through the chamber. The reactants are selected such that spontaneous reaction takes place once the reactants are mixed. Of course, partial reactant mixing prior to introduction into the reaction chamber can be used in some circumstances if there are three or more reactants. To achieve consistent reactions conditions, the spontaneous reactions preferably are not too violent or are appropriately moderated with inert gas. Since the reactants are spontaneously reactive, mixing the ingredients directly leads to a reaction to form the product particles. The reaction zone generally is not well defined since the quantity of reactants varies as the reaction takes place and the amount of reactants decreases.

Flame synthesis is similar to spontaneous chemical reaction except that an activation barrier-prevents spontaneous initiation of the reaction. An energy source is used to initiate the reaction. In this approach, the reaction is sufficiently exothermic that the reaction continues as a chain reaction once the reaction is started. To initiate the reaction, a variety of energy sources can be used, such as, heat, electromagnetic radiation, an electric arc, and/or an electron beam. Similarly, a chemical species, such as, a highly reactive chemical species or a catalyst, can be used to initiate the reaction. The initiating chemical species can be mixed initially with one of the reactants or within shielding gas. Generally, with flame synthesis, the reactants are mixed within the reaction chamber to avoid a risk of damage to the apparatus and of explosion, even though in principle the reaction can be controlled well enough to prevent the reaction from propagating along the reactant stream into the reactant nozzle.

In thermal pyrolysis, the reaction may not supply enough energy to maintain the reaction. Thus, heat is supplied continuously to drive the reaction. Since the reactants are flowing, it is not desirable to supply the heat from the walls of a heated reactor because transfer of the heat to the center of the reactor with an inert gas is inefficient and initiation of the reaction at the wall can result in build-up of the product particles on the wall of the reactor. However, the reactants themselves can be heated if they are mixed within the reactor. Alternatively, an inert shielding gas can be heated to deliver the thermal energy to the reactants. The inert shielding gas preferably is delivered surrounding the reactant stream for reasonably efficient transfer of energy.

Instead of using heat to maintain the chemical reaction, another energy source such as an electric arc can be used. The electric arc generally is supplied within or adjacent the reactant fluid flow. Similarly, electromagnetic radiation can be used as an energy source. The electromagnetic radiation can be focused or unfocused. With unfocused radiation, the reaction can take place throughout the fluid flow between the reaction nozzle and the collectors. If a reaction chamber is present, the electromagnetic radiation may fill the reaction chamber and may or may not be confined to the reaction chamber. Suitable unfocused radiation can be at any portion of the electromagnetic spectrum include, for example, ultra high frequency, radio frequency, microwave, infrared, visible, ultraviolet, and x-ray.

Focused electromagnetic radiation generally is relevant for optical frequencies covering microwave, infrared, visible and ultraviolet wavelengths. Focused radiation can be used to create a well defined reaction zone so that effectively all of the reactions take place within the reaction zone. The reaction zone is defined by the intersection of the focused energy beam with the reactant stream, although the extent of the reaction zone may not correspond exactly with the intersection of the radiation with the reactant stream. The advantage of a well defined reaction zone is that the product particles are more uniform because the reaction conditions are more identical for the different product particles. The product particles are rapidly quenched upon leaving the reaction zone. Qualities of particles produced with focused radiation, such as a laser beam, are described further below.

Laser pyrolysis is the preferred approach for the production of highly uniform particles. The reaction conditions determine the qualities of the particles produced by laser pyrolysis. The reaction conditions for laser pyrolysis can be controlled relatively precisely in order to produce particles with desired properties. Heating of the gases in the reaction zone can be extremely rapid, roughly on the order of $10^5$ degree C./sec depending on the specific conditions. The reaction is rapidly quenched upon leaving reaction zone, and particles are formed in the reactant/product stream. The nonequilibrium nature of the process allows for the production of nanoparticles with a highly uniform size distribution and structural homogeneity.

The fluid stream reaction results in the formation of a chemical particles, generally ultrafine solid particles. The product particles can be collected as a powder loosely associated with the collector material. Suitable collectors for powder collection can include a gas permeable membrane upon which the powders can collect. Alternatively, the collector can include an adhesive or other material into which the particles are embedded. Similarly, the particles can be collected in a liquid to directly form a solution or a dispersion. For example, the particle stream can be passed over a flowing liquid for collection of the particles. The particles can be associated with solvent vapors to absorb or adsorb solvent on the particle surface prior to contacting the flow with the liquid stream to facilitate the collection in the liquid.

The characteristics of the product particles depend significantly on the reaction parameters. Thus, variation of the reaction parameters between the generation of different quantities of separately collected particles results in the production of materially different quantities of particles that are separately collected. In particular, particles with different morphology can be produced. Similarly, the particles can be amorphous or crystalline. Crystalline particles generally have shapes reflecting the crystal lattice, although the particles can have a rough morphology apart from the crystal facets. Average particle sizes can range from several microns to a few nanometers. Approaches based on focused energy that drives the reactions tend to produce highly uniform small particles, including nanoparticles.

An important reaction parameter is the chemical composition of the reactant stream. In particular, the relative quantities of reactants can be systematically varied to evaluate the properties of the resultant product particles. Furthermore, the relative amounts of non-reactants within the reactant stream can be similarly varied to evaluate their influence on the properties of the product particles. Similarly, radiation flux, temperature and other energetic parameters driving the reaction can be systematically varied also.

Generally, the reaction conditions are further characterized by the properties of the fluid flow through the system from the reactant inlet to an exhaust. The pressure in the reaction region is determined by the rate of reactant injection and flow through the particle collector. In some embodiments, the system is open to the ambient environment. Flow through the reaction zone can then be influenced by the force of the reactant injection. Also, the collector may then involve the product particles settling out of the flow and into a suitable container.

While in some embodiments fluid flow is maintained by the force of the injected reactants, in other embodiments, flow through the system is controlled with a pump between the collector apparatus and an exhaust. Then, the system generally includes a reaction chamber sealed from the ambient environment. In these embodiments, each collector preferably includes a gas permeable membrane that acts as a phase separator to separate the solid particles from the fluid flow. In other words, the collector filters preferably a significant fraction of the particles from the fluid flow.

In addition to the collection of different particles within separate collectors, a plurality of different product compositions can be collected within a single collector. Thus, for example, electroactive particles and electrically conductive particles can be sequentially produced and collected in a single collector, such that the mixture is ready for testing in a battery electrode without the addition of more particulates. To better mix the combination of product compositions, the synthesis of the plurality of product compositions can be alternated several times during the collection within the single collector.

The synthesis process preferably is automated to coordinate the reactant flow, the collectors, reaction conditions and any radiation, such as a laser beam. This automation can be used to control the separate collection of product compositions in different collectors and/or for the collection of a plurality of compositions within a single collector. This process is outlined schematically in the diagram of FIG. 2.

Nozzle 70, which delivers reactants to the reaction zone, is connected to a plurality of reactant sources 72. Computer/processor 74 controls the timing and amounts of reactant flow. In particular, processor 74 can be used to turn the flow on and off to separate the production of different product compositions. Similarly, when the flow is on, the relative amounts of the different reactants can be adjusted, as desired. Similarly, a laser or other radiation source 76 can be controlled to produce pulses 78. The pulses can be timed to coincide with pulse of reactant flow 80 from nozzle 70, with appropriate adjustment for flow time in the system. Reactant and radiation pulses can be of relative short duration, such as 0.1 seconds, of relatively long duration, such as several hours, or of intermediate duration. The reactant pulses generally are spaced sufficiently in time to avoid undesired contamination in the synthesis process of the production of one type of compositions with reactants intended to produce another type of composition.

Figure 2:
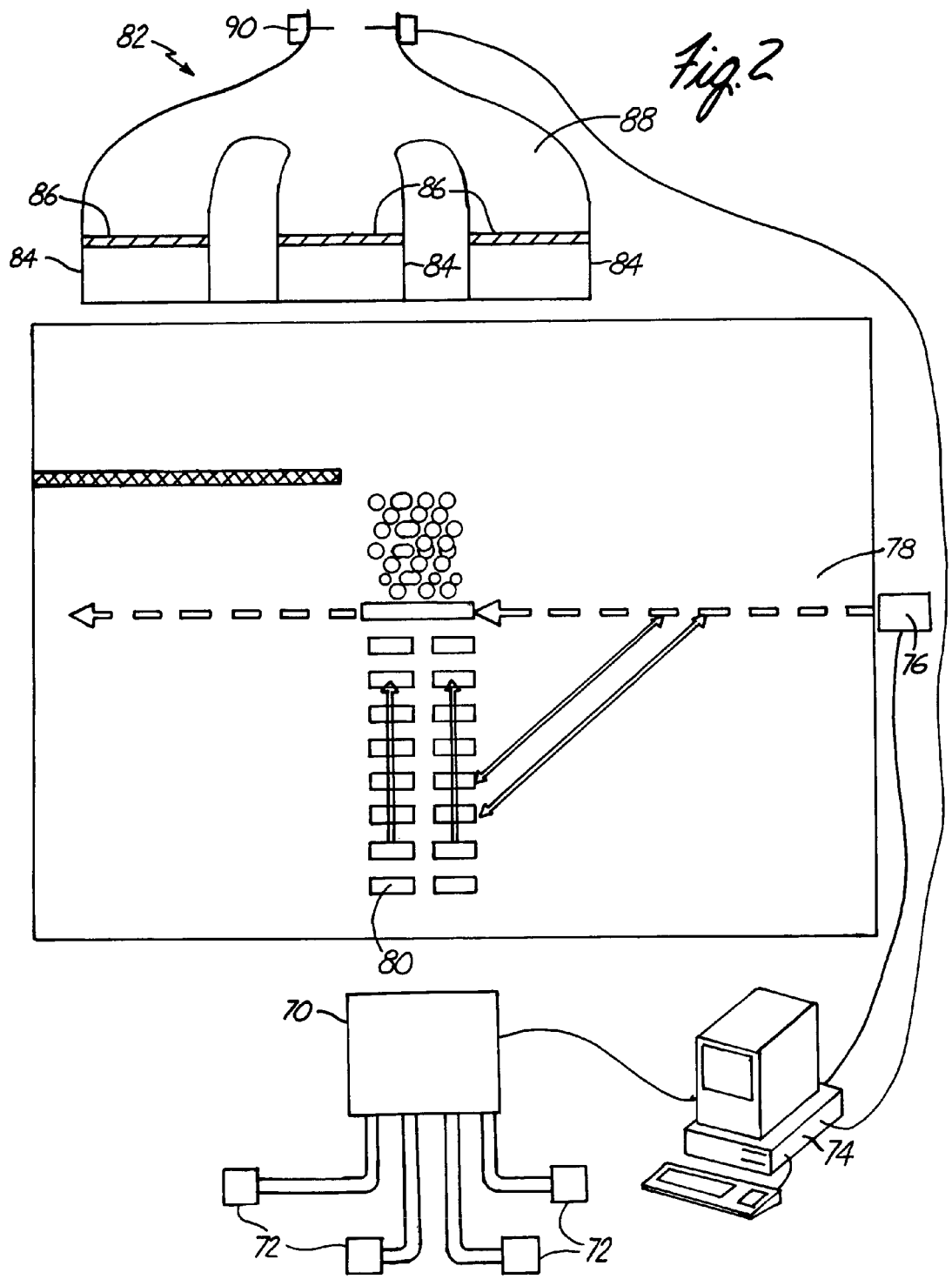
FIG. 2 is a schematic depiction of an apparatus preforming the synthesis of a plurality of compositions with an automated system that coordinates pulses of reactants and radiation as well as positions the collector relative the reactant nozzle.

Similarly, a collector 82 can be coordinated with the operation of nozzle 70 and radiation source 76. If all of the different compositions are to be placed into a single collector, the collector is not changed except possibly to control the pumping rate through the collector. If a plurality of collectors are used to collect one or more compositions in each, processor 74 can be used to coordinate the selection of the collector based on the desired particles to be collected. As shown in FIG. 2, collection system 82 includes a plurality of collectors 84. Each collector 84 includes a filter 86 or the like and is connected to a manifold 88 leading to a pump. In this embodiment, the selected collector is rotated into position by motor 90. Generally, any relative movement of the collector and the nozzle is performed between pulses of reactants.

Fluid Synthesis Apparatus

Figure 3:
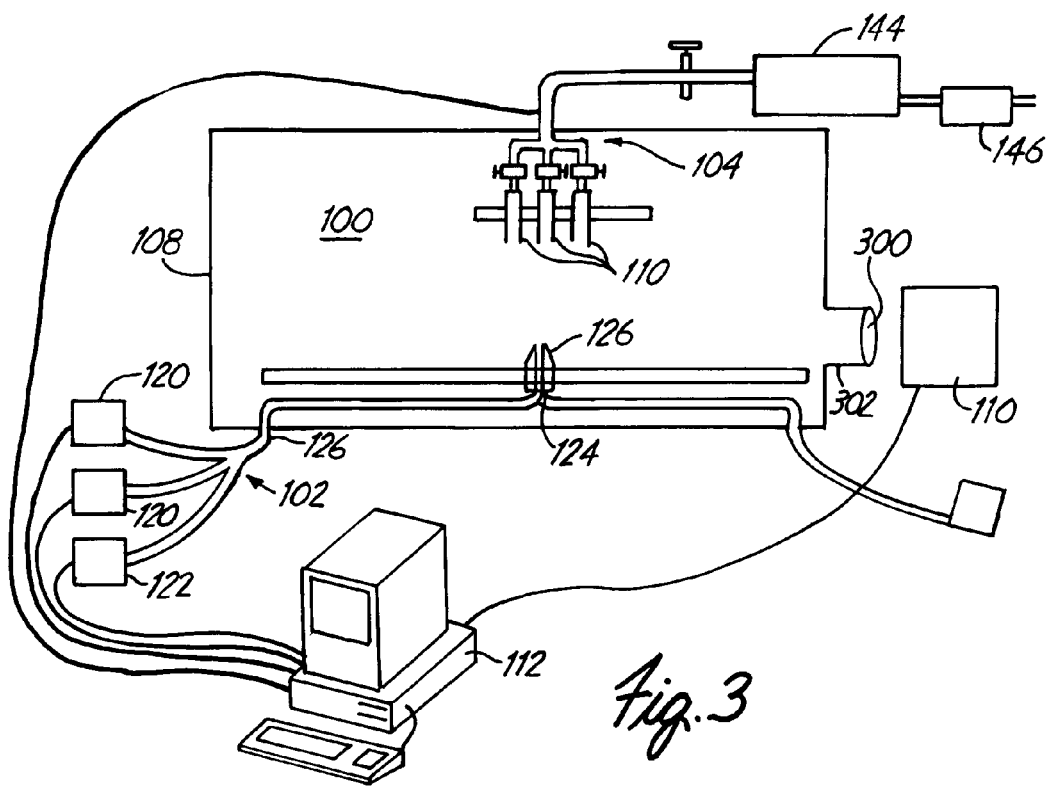
FIG. 3 is a schematic layout of an apparatus for performing combinatorial chemical synthesis with fluid stream reactions.

Referring to FIG. 3, a system for the production of a plurality of quantities of product particles from fluid stream reactions is shown. System 100 includes a reactant delivery apparatus 102 and a collector apparatus 104. In preferred embodiments, a reactant inlet of reactant delivery apparatus 102 moves relative to particle collectors of collector apparatus 104. System 100 can optionally include a reaction chamber 108 to enclose the fluid stream reaction and a radiation source 110. Furthermore, system 100 preferably is controlled by a processor 112.

Reactant delivery apparatus 102 includes one or more reactant sources 120 and may include additional sources 122 of other compositions for introduction into the fluid reactant stream such as carrier gases, inert diluents and radiation absorbers. Suitable sources depend on the form of the compound. Gas cylinders and the like can be used for the delivery of gaseous compounds. Volatile liquids can be delivered by bubbling a carrier gas through a container of liquid. Volatile solids can be delivered by passing carrier gas over a heated solid. A variety of compounds can be delivered into the fluid reactant stream as an aerosol where a liquid is delivered to the aerosol generator.

Reactant delivery apparatus 102 further includes a nozzle 124 or the like with one or more reactant inlets 126. Multiple reactant inlets are particularly desirable to combine highly reactive reactants within the reaction chamber. Nozzle 124 connects to sources 120, 122 by way of one or more conduits 126. If nozzle 124 moves relative to sources 120, 122, conduits 126 should be flexible, such that they do not restrict the movement of nozzle 124. In preferred embodiments, the reactant stream is surrounded by a blanket of inert shielding gas to help limit the spread of the reactant stream. Reactant inlets can be elongated to provide additional reactant throughput without needing a wide reactant stream that could yield less uniform reaction conditions. In particular, the length of the inlet can be at least about 2 times its width.

Reactant delivery apparatus can include additional nozzles for the simultaneous generation of separate reactant streams. To prevent interference with the reactions associated with the individual nozzles, these streams generally are kept physically separated as well as separated by flows of shielding gas. To avoid interference between the reactions associated with the different nozzles, the physical separation should be significant. Since the reactions associated with the nozzles are separate, the use of multiple nozzles is equivalent to the use of a corresponding number of separate reactors except that in some circumstances efficient use of space and radiation may be possible. Since it is impractical to use a significant number of well isolated nozzles, the use of a plurality of nozzles alone generally does not lead to an efficient method for combinatorial synthesis in comparison with using a plurality of collectors with one or more nozzles.

As noted above, in preferred embodiments, the nozzle 124 moves relative to the collectors. Referring to one preferred embodiment in FIG. 4, a moveable nozzle 130, such as an inkjet nozzle, is mounted on a track 132. Nozzle 130 is moved along track 132 by motorized rollers 134 connected to nozzle 130 by wires 136. A stepper motor or the like can be used to position nozzle 130 at a position aligned with a particular particle collector.

Nozzle 124 can be used to deliver gaseous and or aerosol compositions into the reactant stream. Aerosols include small liquid or solid droplets generally, but not necessarily, with a carrier gas. In other words, as used herein, aerosols include mists of liquids with small droplets. Suitable aerosol generators can be produced, for example, with an ultrasonic nozzle, with an electrostatic spray system, with a pressure-flow or simplex atomizer, with an effervescent atomizer or with a gas atomizer where liquid is forced under significant pressure through a small orifice and fractured into particles by a colliding gas stream. Suitable ultrasonic nozzles can include piezoelectric transducers. Suitable atomizers for the production of uniform aerosols include a twin orifice internal mix atomizer, which are available from Spraying Systems (Wheaton, Ill.). Suitable aerosol generators are described further in copending and commonly assigned, U.S. patent application Ser. No. 09/188,670, now U.S. Pat. No. 6,193,936 to Gardner et al., entitled "REACTANT DELIVERY APPARATUS," incorporated herein by reference.

Similarly, small droplets or fine mists of liquid can be produced with ink jet type nozzles or fuel injector type nozzles. Ink jet nozzles can operate, for example, by thermal heating of the liquid to produce a bubble that is propelled out from the nozzle. Alternatively, a piezoelectric transducer is used to propel small droplets from the nozzle. In a fuel injector type nozzle, the liquid is under pressure behind the tip. The tip is opened by electronic control to release a fine mist of the liquid.

Aerosols can be created directly into the reactant fluid flow leading to the reaction zone or within the reactant delivery system 102 for delivery through nozzle 124. Generally, the production of the aerosol within reactant delivery system 102 for subsequent delivery with a carrier gas through an inlet provides for the production of a more uniform aerosol which may or may not be significant for certain product particles.

The use of an aerosol provides for the use of a wider range of metal/metalloid and other precursors for laser pyrolysis than are suitable for gaseous delivery only. Thus, less expensive precursors may be available with aerosol delivery. Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution. Aerosol reactants can be used to obtain a significant reactant throughput. Suitable solvents include water, methanol, ethanol, isopropyl alcohol, other organic solvents and mixtures thereof.

Figure 5:
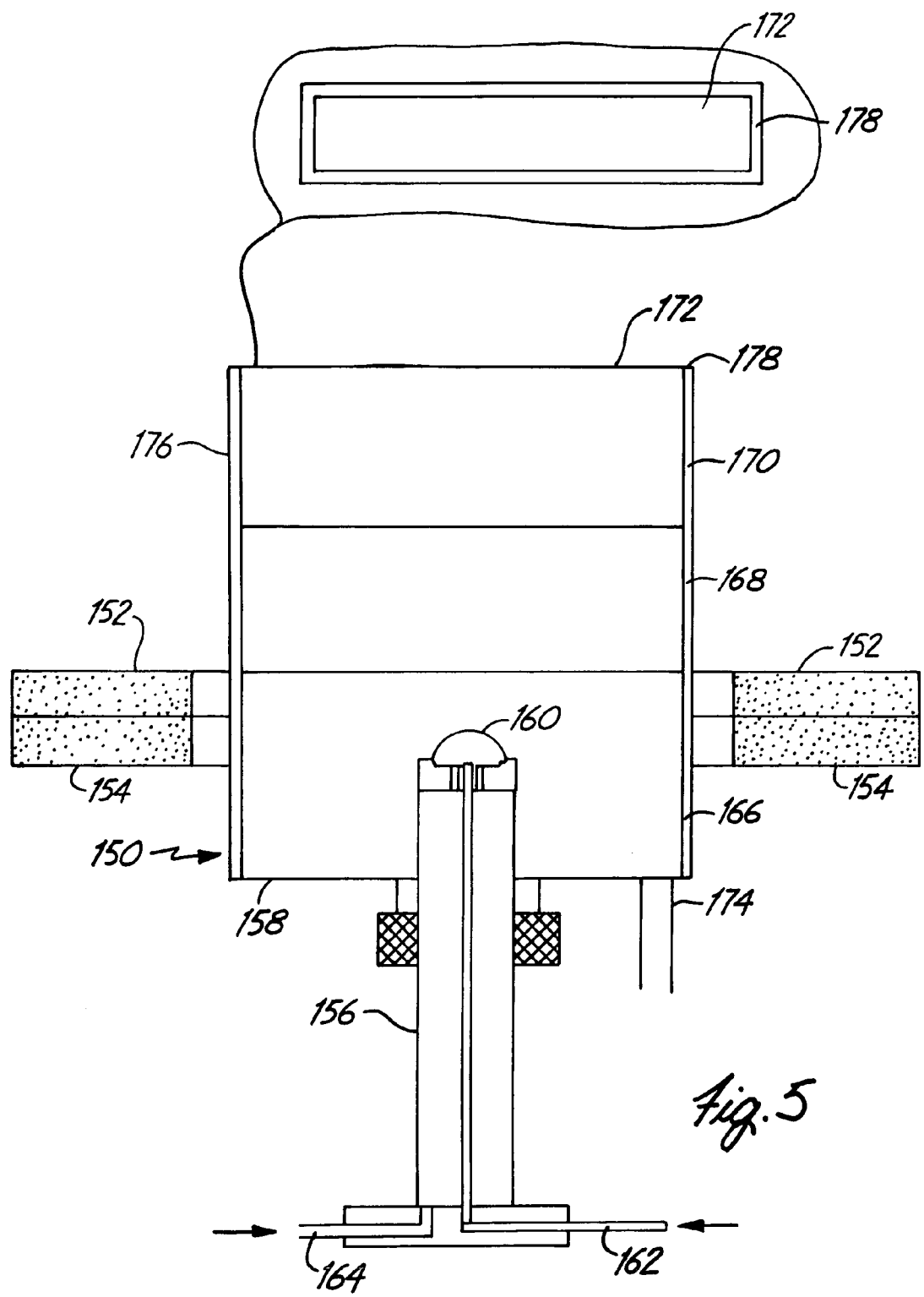
FIG. 5 is a sectional view of an inlet nozzle, the cross section being taken along the length of the nozzle through its center.
Figure 6:
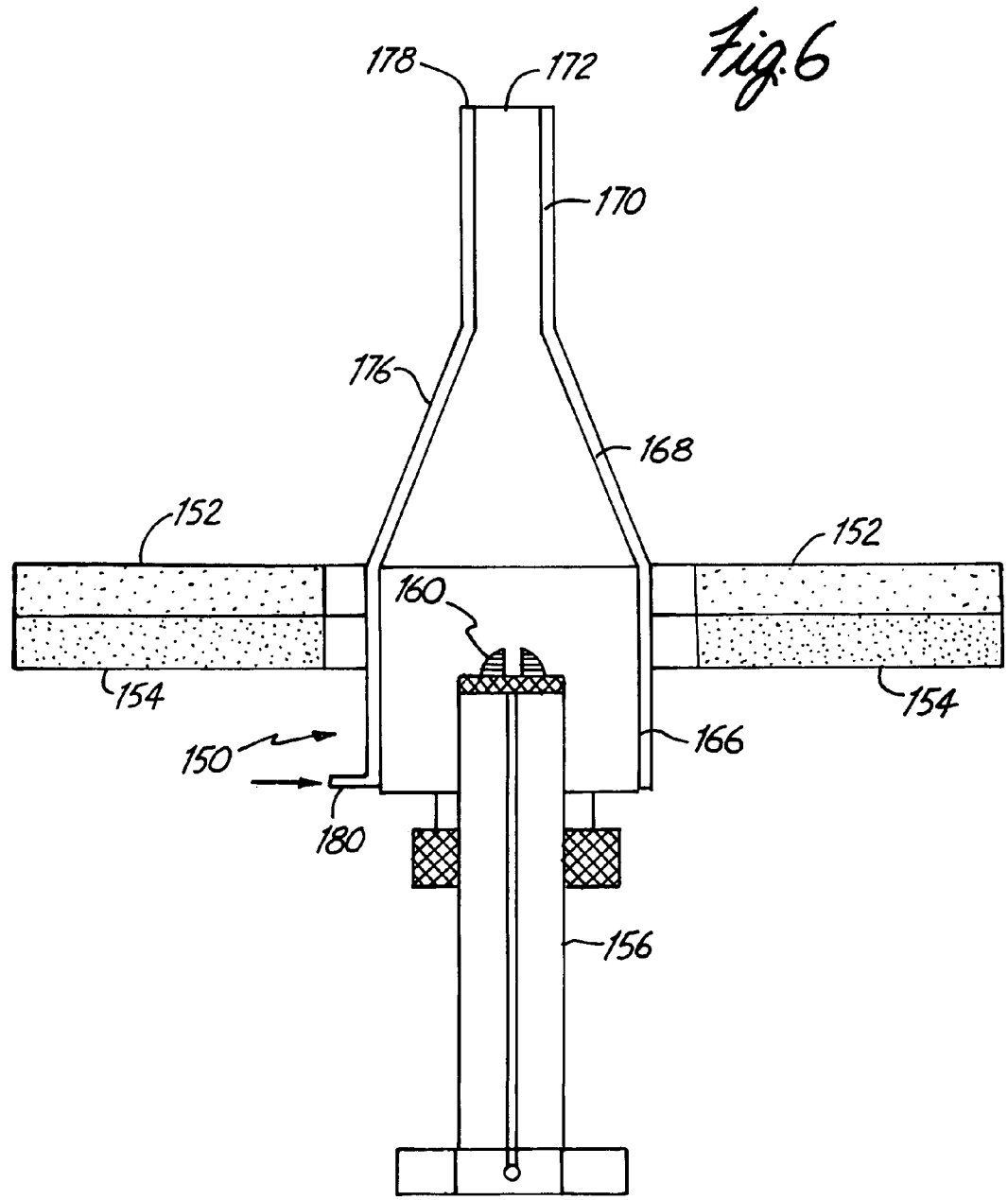
FIG. 6 is a sectional view of the inlet nozzle of FIG. 5, the cross section being taken along the width of the nozzle through its center.

As shown in FIGS. 5 and 6, inlet nozzle 150 connects with reaction chamber 108 at its lower surface 152. Inlet nozzle 150 includes a plate 154 that bolts into lower surface 152 to secure inlet nozzle 150. Inlet nozzle 150 includes an inner nozzle 156 and an outer nozzle 158. Inner nozzle 156 preferably has a twin orifice internal mix atomizer 160 at the top of the nozzle. Suitable gas atomizers are available from Spraying Systems, Wheaton, Ill. The twin orifice internal mix atomizer 160 has a fan shape to produce a thin sheet of aerosol and gaseous precursors. Liquid is fed to the atomizer through tube 162, and gases for introduction into the reaction chamber are fed to the atomizer through tube 164. Interaction of the gas with the liquid assists with droplet formation.

Outer nozzle 158 includes a chamber section, 166, a funnel section 168 and a delivery section 170. Chamber section 166 holds the atomizer of inner nozzle 156. Funnel section 168 directs the aerosol and gaseous precursors into delivery section 170. Delivery section 170 leads to a rectangular outlet 172, shown in the insert of FIG. 5. Outer nozzle 158 includes a drain 174 to remove any liquid that collects in the outer nozzle. Outer nozzle 158 is covered by an outer wall 176 that forms a shielding gas opening 178 surrounding outlet 172. Inert gas is introduced through inlet 180.

Referring to FIG. 3, the collection apparatus includes a plurality of particle collectors 140. Generally, each collector is used to collect a quantity of particles produced under one particular set of reaction parameters. Thus, a plurality of collectors 140 are included to collect the desired number of samples in a particular single run. If the collectors can be replaced without disturbing the particle collection process in another collector, the collectors can be replenished at increments such that the collection process can be continued indefinitely.

Figure 7:
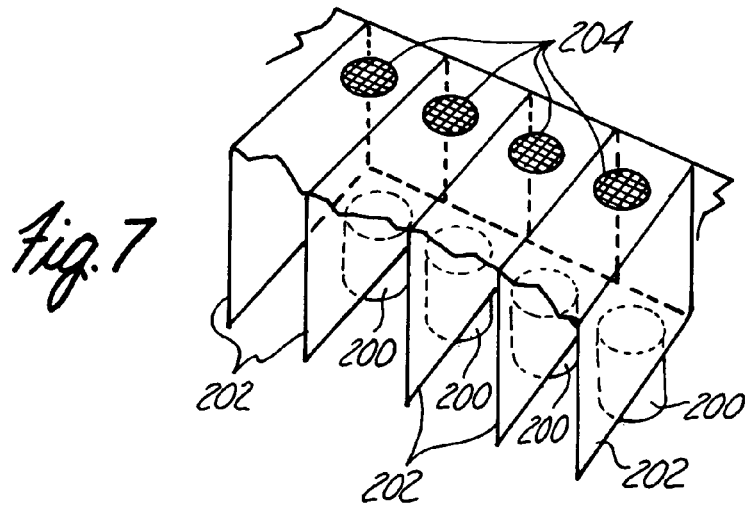
FIG. 7 is a fragmentary, perspective view of a collector apparatus operating near atmospheric pressures, in which hidden structure is shown in phantom lines.

In a one embodiment, the fluid stream is vented to atmospheric pressure through a filer. Particle collectors 140 comprise containers into which the particles gather when they fall out of the fluid flow. For these embodiments, it may be desirable to direct the fluid reactant stream horizontally. Fluid flow through the system is maintained by the force of the injected reactant stream. Suitable collectors 200 for this embodiment are shown in FIG. 7. Collectors 200 can be small cups or the like placed to collect settling particles. Flow to each collector is separated by dividers 202. Openings covered by a filter 204 provide for venting. Product particles settle into collectors 200 which can be disconnected from the collector apparatus, if desired for evaluation of the particles.

Referring to FIG. 3, in preferred embodiments, reaction system 100 includes a reaction chamber 108 sealed from the ambient environment. Generally, a pump 144 is used to maintain flow through the chamber 142. Suitable pumps include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. A scrubber or other exhaust abatement apparatus 146 can be connected to the exhaust from pump 144. With moderate production rates, a liquid nitrogen trap can be used for exhaust abatement. If a pump is used to maintain the pressure in the chamber, flow to a particular collector 140 is maintained by directing the pumping force to a particular collector 140.

Figure 8:
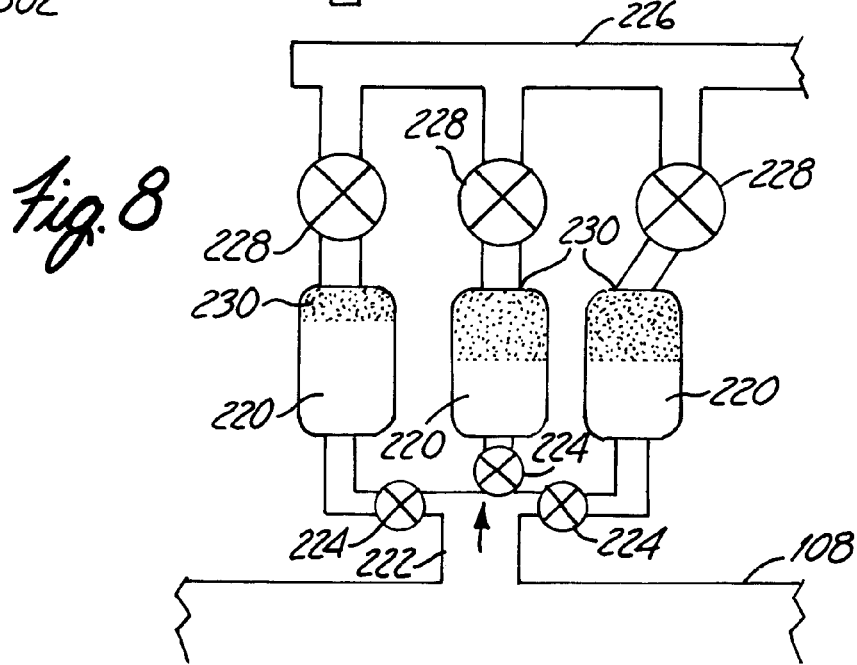
FIG. 8 is a schematic side view of a collector apparatus with a plurality of collectors connected to a pump manifold.

In a particular embodiment based on a pump shown in FIG. 8, a plurality of collectors 220 are connected to a single outlet 222 from reaction chamber 108. Valves 224 can be used to control the flow into each collector 220. Collectors 220 are further connected to a pump manifold 226 which leads to pump 144. Valves 228 can be used to control the connection of collectors 220 with pump manifold 226. Manual or automatic valves can be used. Automatic valves are preferred for the automation of the combinatorial synthesis process. Filters 230 are generally located at the end of collectors 220 leading to valves 228. Flat, cylindrical and other shaped filters can be used to facilitate collection of a desired quantity of particles and analysis of the collected materials. Filters can be formed, for example, from glass fibers, Nomex® material or woven metal. While three collectors 220 are shown in FIG. 8, this embodiment can be configured to use a larger number of collectors 220, such as at least about 10 collectors.

One or more collectors can be used as a waste collector. Flow is directed to the waste collector while conditions are stabilizing within the reaction system. Generally, conditions stabilize quickly such that a waste collector is not needed, although the use of a waste collector is an option to ensure the collection of more uniform particles.

Figure 4:
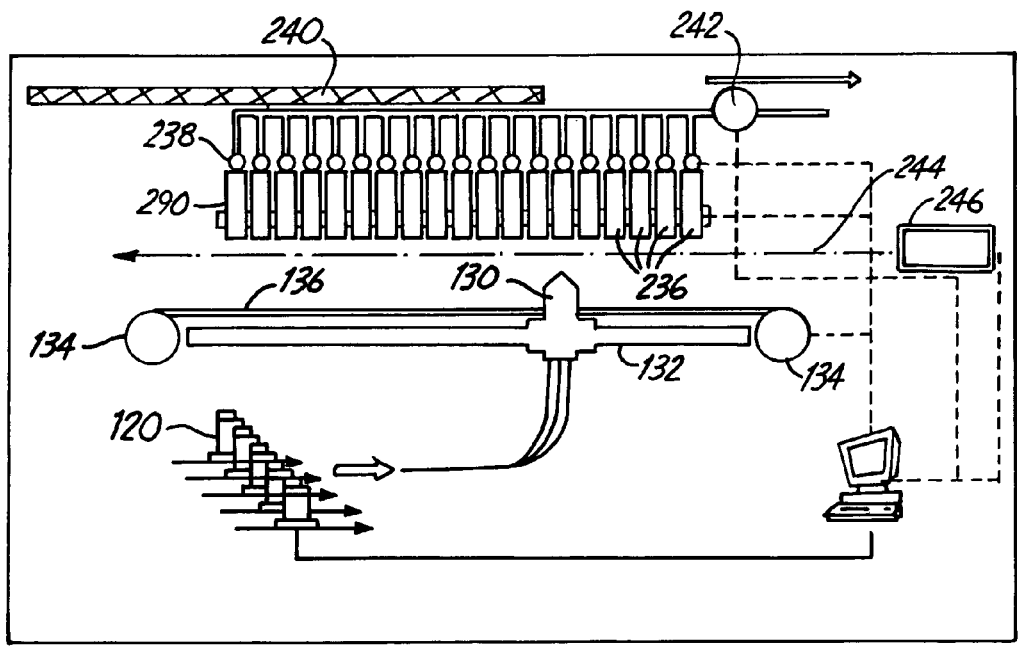
FIG. 4 is a schematic layout of an embodiment of an apparatus for performing combinatorial chemical synthesis with a reactant delivery nozzle mounted on a track for accessing collectors.

In preferred embodiments, directing the flow to a particular collector can be assisted further by moving the nozzle relative to the collector to direct the fluid reactant flow toward the particular collector. Referring to FIG. 4, a plurality of collectors 236 are mounted above nozzle 130, which moves along track 132. Each collector 236 is connected to a valve 238 leading to a pump manifold 240. Pump manifold 240 leads to pump 242. In this embodiment, collectors 236 can include a tubular element with a filter. The tubular element directs the fluid flow from the reaction zone toward the filter. The filter separates particles from the fluid flow into pump manifold 240. This embodiment is configured with two or more collectors and can be configured with at least about 10 collectors, or with at least about 20 collectors, or even with at least about 50 or more collectors. If the apparatus in FIG. 4 is used for laser pyrolysis or other focused radiation synthesis, the focused energy beam 244 from radiation source 246 can be directed parallel to track 132 such that beam 244 intersects the fluid reactant stream at the various positions of nozzle 130.

In this embodiment, nozzle 130 is aligned with a particular collector 236 to collect a quantity of particles produced under a particular set of reaction conditions. The reactant flow and any radiation are turned on for the time provided for the synthesis of the particular particles. At the end of the time, the reactant flow and radiation field preferably are turned off, and nozzle 130 is moved along track 132 to a position aligned with the next collector to collect another quantity of particles generally produced under different reaction parameters. Then, the reaction is re-initiated at the particular reaction parameters associated with that collector. The process is continued until the desired number of collectors have been used.

The nozzle can be used to move in two dimensions to access a two dimensional array of collectors. A comparable two dimensional track can be used to move the nozzle. If a laser beam or other focused energy beam is used, a mirror mounted on a stand that can move along the laser beam can be used to direct the laser beam over the nozzle when the nozzle is moved away from the undeflected laser path.

Alternatively or in addition to the use of a moveable nozzle, collectors 236 can be mounted to move relative to nozzle 130. For example, collectors 236 can be mounted on a similar track as track 132 to move collectors 236 relative to a fixed nozzle. In one particular embodiment, a two dimensional array of collectors is mounted above nozzle 130 on track 132. Movement of nozzle 130 on track 132 provides for the use of one row of collectors 236. The collector array is then moved perpendicular to the movement of nozzle 130 along track 132 to align another row of collectors with nozzle 130. In this way, the array of collectors 236 is used one row at a time. Alternatively, the nozzle can move in two dimensions to access all of the collectors in a two dimensional collector array. The collector array can include, for example, 20 by 20 collectors for a total of 400 collectors. More or fewer collectors can be used as desired.

Figure 9:
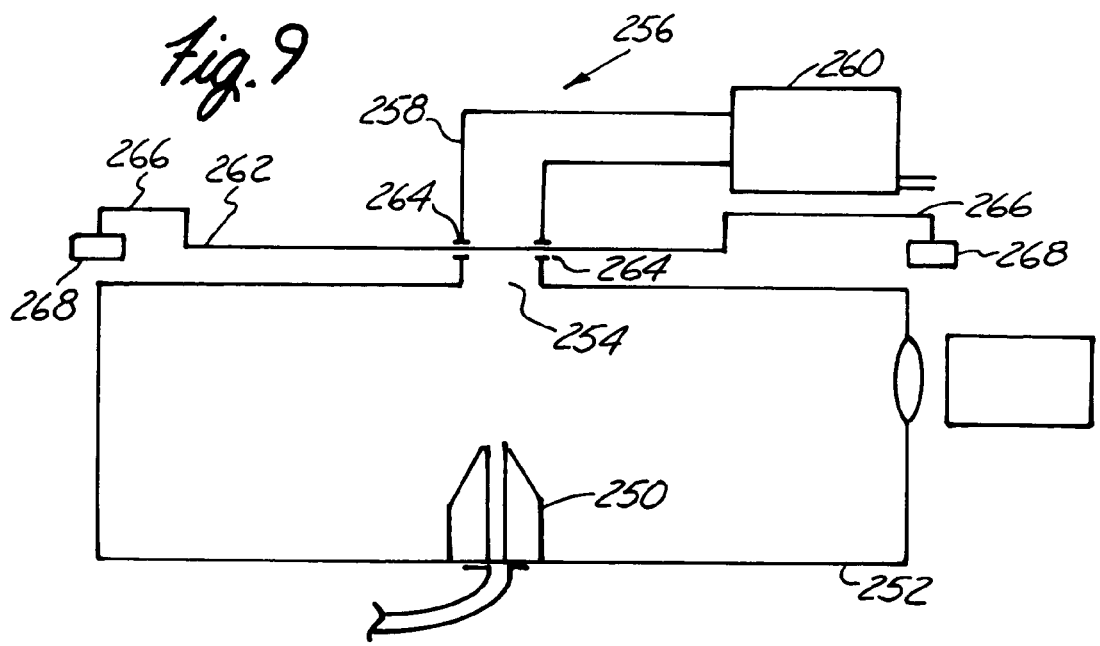
FIG. 9 is a schematic view of an alternative embodiment of a collector apparatus with a moveable filter matrix.

Another embodiment with a fixed nozzle and a movable collector is shown in FIG. 9. Fixed nozzle 250 is mounted within reaction chamber 252 to produce a fluid reactant stream directed toward outlet 254. Outlet 254 leads to collection apparatus 256. Collection apparatus 256 has a channel 258 leading to pump 260. A filter sheet 262 is mounted to extend through channel 258. Flexible seal 264 forms a seal between filter sheet 262 and channel 258. Flexible seal 264 can be formed from natural or synthetic rubbers or metal, and can be cooled, for example, with water.

Figure 10:
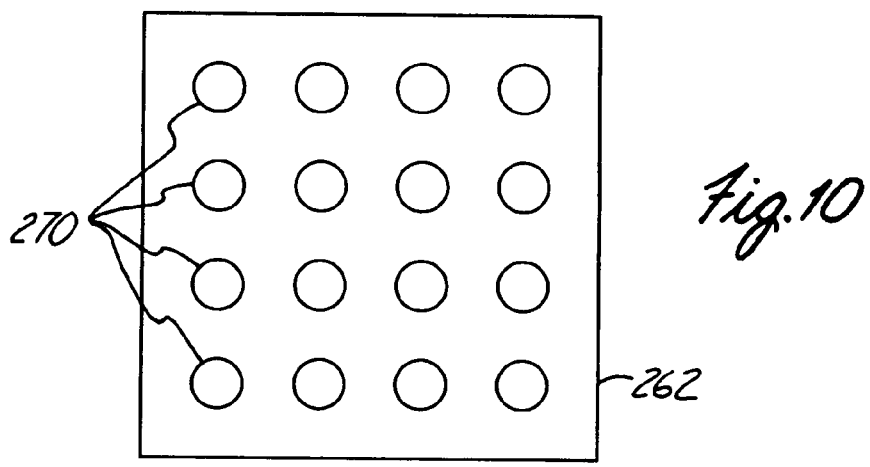
FIG. 10 is a top view of a filter matrix with regions identifiable as a collector for a particular compound.

Flexible seal 264 is connected to one or more positioning arms 266 that are interfaced with actuators 268. Motorized actuators position arms 266 to move a selected portion of filter sheet 262 into channel 258. Referring to FIG. 10, filter sheet 262 is divided into a set of particle collectors 270, where each collector is an isolated position along the plane of the filter sheet. Particle collectors 270 are sequentially placed within channel 258. When the desired quantities of particles are collected by a particular particle collector 270, actuator arms move the filter sheet 262 to position another particle collector 270 in channel 258.

If the synthesis apparatus operates at pressures other than near atmospheric pressures, the collectors can be removed after particle synthesis ends, and the chamber is brought to atmospheric pressure. For example, laser pyrolysis generally is performed at pressures from about 80 torr to about 650 torr. If it is desired to obtain the collectors while composition synthesis continues, air lock structures can be used.

Referring to FIG. 11, reaction chamber 272 includes a reactant delivery nozzle 274 oriented generally toward collection system 276. Collection system 276 includes a collector 278, a pump 280 and two locking chambers 282, 284. Collector 278 can be a filter element, a cup-shaped collector or any other appropriate collector element. The apparatus can be generalized to include a plurality of collectors that can be moved into or out from locking chambers 282, 284. Various collector arrays described herein can be adapted for this purpose.

Locking chambers 282, 284 include sealing doors 286, 288, respectively, that open into channel 290. Locking chambers 282, 284 further include robotic arms 292 and actuators 294 for moving collector/collector array 278 between channel 290 and locking chambers 282, 284. The robotic arms can be replaced with belts, tractor mechanisms or the like. In FIG. 11, arms 292 are depicted in phantom lines to indicate their position when the appropriate sealing door 286, 288 is open to allow access to channel 290. Locking chambers 282, 284 further include pressure systems 296 to provide for changes in pressure within the locking chambers between the reaction chamber pressure and atmospheric pressure. Furthermore, locking chambers 282, 284 include sealing access doors 298 for placement and removal of collectors.

Using the system shown in FIG. 11, a collector or collector array can be introduced into one of the locking chambers through an access door 298. Then, the locking chamber can be brought down to reaction chamber pressure. Once this pressure is reached, the corresponding sealing door is opened, and the collector is moved within channel 290. After a product sample(s) is collected, a sealing door to one of the locking chambers already at reaction chamber pressure is opened, and the collector(s) is removed into the locking chamber. Once removed, the sealing door is closed and another collector(s) can be placed within channel 290. The locking chamber with the collector(s) and product sample(s) is sealed from the chamber and brought to atmospheric pressure. At atmospheric pressure, the access door can be opened to remove the collector(s). The process can be repeated until all of the desired samples are collected.

Figure 12:
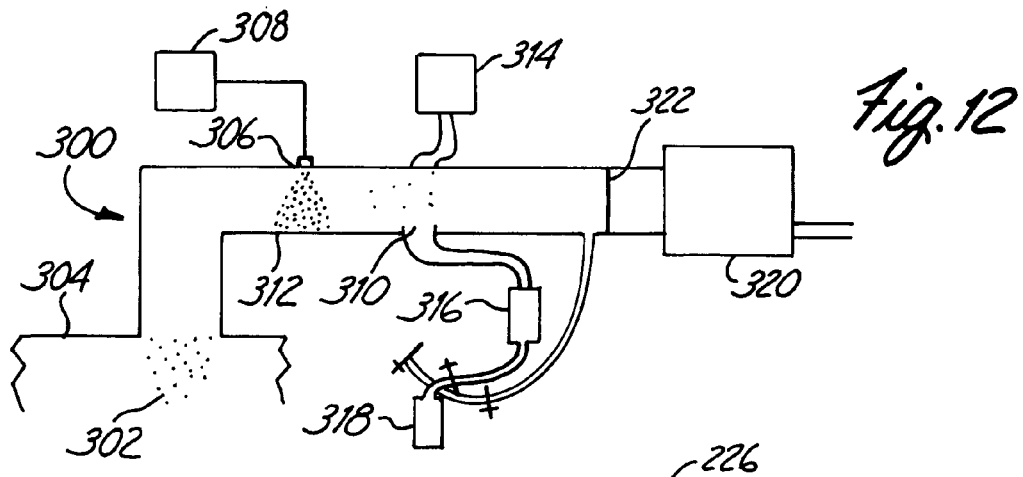
FIG. 12 is a schematic, sectional view of a collector for collecting particles in a moving liquid stream, wherein the section is taken through the apparatus to expose features within the collector.

A collection system for directly collecting solid particles in a liquid dispersion, is shown in FIG. 12. Collection system 300 receives product particles 302 from reaction system 304. A liquid mist is sprayed onto the product particles by spray nozzle 306 connected to liquid source 308. A liquid stream is passed through a trough 310 running along the bottom of collection channel 312. Liquid is supplied to trough 310 from liquid source 314. Liquid from trough 310 with collected particles flows to reservoir 316 which collects the liquid. Liquid from reservoir 316 can be drained into bottle 318 for removal, storage and evaluation. A plurality of bottles 318 can be used to collect a plurality of samples. Channel 312 is connected to a pump 320. A filter 322 can be used to remove any residual particles from channel 312. Bottle 318 is connected to a set of valves 324 that can be used to selectively connect bottle 316 to receive liquid, to pump 320 to remove air from bottle 318 or to atmosphere so that bottle 316 is at atmospheric pressure before it is removed and replaced. Centrifugation or other reasonable approaches can be used to remove product particles from the collection fluid.

Reaction chamber 108 can be constructed from any durable and inert material. For most reactants, stainless steal is a particularly convenient material due to its durability and corrosion resistance. If radiation source 110 is mounted on the outside of chamber 108, a window or lens 300 can be mounted on the chamber with an air tight seal to allow for the entrance of the radiation.

For infrared light zinc selenide lenses or windows are appropriate. Appropriate ZnSe lenses are available from Laser Power Optics, San Diego, Calif. To reduce contamination on the surface of the window/lens 300, window/lens 300 can be displaced from the main chamber cavity along a tube 302. For laser pyrolysis, radiation source 110 can be an infrared laser, especially a CW $CO_2$ laser such as an 1800 watt maximum power output laser available from PRC Corp., Landing, N.J.

As noted above, system 100 preferably is controlled by a processor 112. Processor 112 can be any reasonable computer, such as, a WINDOWS® based computer, a MacIntosh® computer or a UNIX® computer. Appropriate commercially available software can be adapted to operate the system. Processor 112 can be used to control, for example, stepper motors that position the collectors and nozzle relative to each other, sample temperature, radiation output, pump speed, valve positions, reactant flow.

Further Processing

Following collection of a quantity of particles, the particles can be subjected to additional processing while associated with the particle collector. In some embodiments, this additional processing can be performed while the particle collector is still mounted in its position within the particle synthesis apparatus. Suitable additional processing includes, for example, heat treatment, chemical blending and combinations thereof. Any additional processing can be performed on a subset of one or all the samples such that some samples can be retained in the unprocessed state.

1. Heat Processing

Properties of particles can be modified by heat processing. Suitable starting material for the heat treatment include nanoparticles, such as those produced by laser pyrolysis. The heat processing of nanoparticles can improve the crystallinity, remove contaminants, such as elemental carbon, and possibly alter the stoichiometry, for example, by incorporation of additional oxygen or of atoms from other gaseous or nongaseous compounds.

The processing conditions can be mild, such that significant amounts of particle sintering does not occur. If particle sintering is to be avoided, the temperature of heating preferably is low relative to the melting point of both the starting material and the product material. Alternatively, the particles can be sintered or partially sintered if the properties of the sintered product are to be evaluated. For example, some controlled sintering of the particles can be performed at moderate temperatures to produce slightly larger, average particle diameters.

The heating can take place in the collector without altering the natural environment in the particle synthesis apparatus. In other embodiments, the collector is sealed from the natural atmosphere in the apparatus, as described below, and a controlled atmosphere is provided for the heating process. The controlled atmosphere over the particles can be static, or gases can be flowed through the isolated collector. The atmosphere for the heating process can be an oxidizing atmosphere or an inert atmosphere. In particular, for conversion of amorphous particles to crystalline particles or from one crystalline structure to a different crystalline structure of essentially the same stoichiometry, the atmosphere generally can be inert.

Appropriate oxidizing gases include, for example, $O_2$, $O_3$, Co, $CO_2$, and combinations thereof. The $O_2$ can be supplied as air. Similarly, appropriate reducing gases include $H_2$ and hydrocarbons. Oxidizing gases or reducing gases optionally can be mixed with inert gases such as Ar, He and $N_2$. When inert gas is mixed with the oxidizing gas or reducing gas, the gas mixture can include from about 1 percent oxidizing/reducing gas to about 99 percent oxidizing/reducing gas, and more preferably from about 5 percent oxidizing/reducing gas to about 99 percent oxidizing/reducing gas. Alternatively, either essentially pure oxidizing/reducing gas or pure inert gas can be used, as desired.

The precise conditions can be altered to vary the type of nanoparticles that are produced. For example, the temperature, time of heating, heating and cooling rates, the gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

Referring to FIG. 4, a heating mantle 290 is attached to collectors 250 to provide heating of the collectors. Heating mantle 290 can be designed to selectively heat particular particle collectors 250, or to simultaneously heat all particles collectors 250. Heating mantle 290 can operate by electrical resistance heating or by the flow of a heated fluid, such as water, or by any other suitable heating approach.

Figure 13:
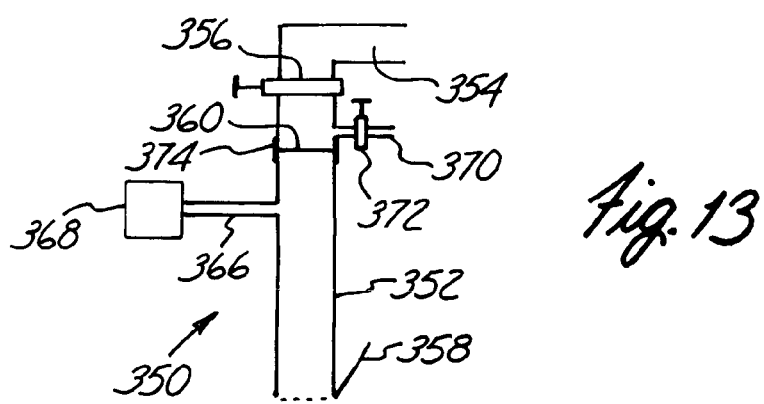
FIG. 13 is a side view of a collector designed to provide for heat processing in a controlled environment.

Referring to FIG. 13, a particle collector 350 is adapted for heating under a controlled atmosphere. Collector 350 includes a tubular structure 352 that leads to a pump manifold 354 through valve 356. Particle collector 350 further includes a pivoting hatch 358 that can be closed, as shown in phantom lines in FIG. 13. If hatch 358 and valve 356 are both closed, filter 360 within tube 352 is isolated from the other components of the particle synthesis apparatus. Filter 360 is used to collect the product particles within collector 350.

With filter 360 isolated from the reaction synthesis apparatus, a controlled atmosphere can be provided by flowing gas into tube 352 from supply tube 366 connected to gas source 368. Gas is then vented through exhaust tube 370 with valve 372 open. A heating mantle 374 can be placed around tube 352 near filter 360 to provide desired heating. To inhibit the collection of product particles in supply tube 366, a small flow rate can be used through supply tube 366 while product particles are collected on filter 360.

Various flow rates through supply tube 366 can be used for controlled heat processing, and a suitable value of the flow rate will generally depend on the size of the collector. For a one inch collector tube 352, the flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

Alternatively, the collects can be removed as a unit or individually from the synthesis apparatus to perform a heat processing step. A unit with a plurality of collectors can be processed simultaneously or in parallel under the same conditions or under different conditions. If desired, the particles can be removed from the collectors for heat processing. Removal of the particles from the collector is described further below.

For the processing of nanoparticles of many of the materials described herein without significant amounts of sintering, the temperature generally ranges from about 50° C. to about 600° C. and in most circumstances from about 60° C. to about 400° C. Generally, higher temperatures would be used for sintering. The heating generally is continued for about 5 minutes or more. Preferred heating temperatures and times will depend on the particular starting material and target product. Some empirical adjustment may be required to produce the conditions appropriate for yielding a desired material.

The conditions to convert crystalline $VO_2$ to orthorhombic $V_2O_5$ and 2-D crystalline $V_2O_5$, and amorphous $V_2O_5$ to orthorhombic $V_2O_5$ and 2-D crystalline $V_2O_5$ are described in U.S. Pat. No. 5,989,514, to Bi et al., entitled "Processing of Vanadium Oxide Particles With Heat," incorporated herein by reference.

2. Chemical Blending

In addition to heat processing, additional processing can include the addition of other chemical compositions to the collected particles. Suitable chemicals can be used to convert the particles to a suitable form for further evaluation or for reacting the particles to form a different chemical composition. For example, suitable chemicals for addition to the collected particles include, for example, solvents, dispersants, binders and other powders. Suitable binders include, for example, solutions of polymers, such as vinyl polymers. Other powders include, for example, electrically conductive particles and particles of a composition that react with the synthesized particles under appropriate conditions.

Figure 14:
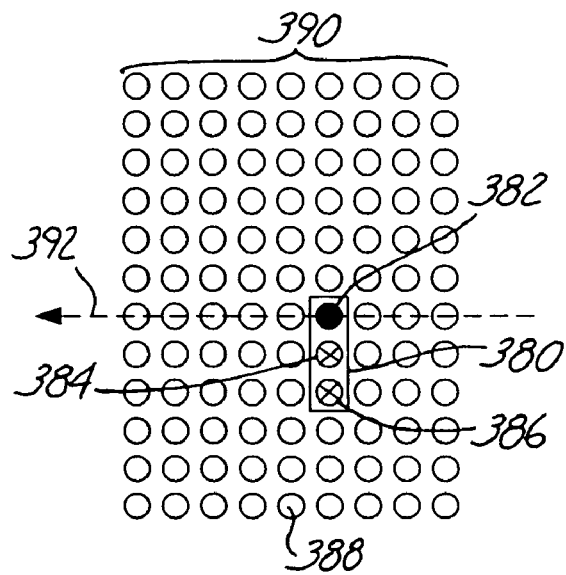
FIG. 14 is a bottom view of an array collector with a nozzle for synthesis as well as adding additional compounds to the collected compositions.
Figure 17:
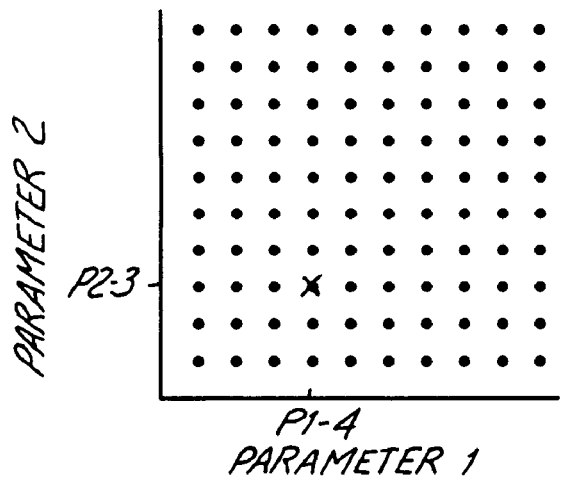
FIG. 17 is a schematic depiction of a region of parameter space related to two parameters to be explored in a single combinatorial synthesis run.
Figure 18:
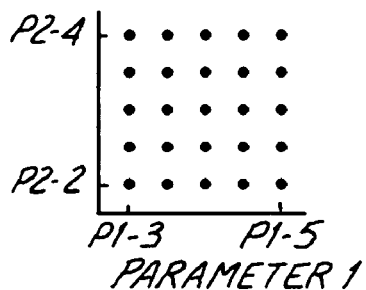
FIG. 18 is a schematic depiction of an expanded region of two parameters to be explored in a combinatorial synthesis run.
Figure 19:
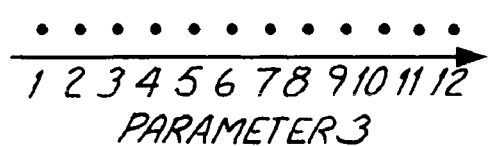
FIG. 19 is a schematic depiction of a single reaction parameter to be varied over a combinatorial synthesis run.

Referring to FIG. 14, a single nozzle 380 includes a reactant delivery inlet 382 and additional inlets 384 and 386 for the delivery of additional compounds to selected collectors 388 in array 390. Reactant delivery inlet 382 is aligned with radiation path 392, if applicable. In some embodiments with additional inlets, only one additional inlet is used or more than two are used. Furthermore, additional inlets 384 and 386 can be mounted on a separate nozzle from reactant delivery inlet 382.

The addition of chemical compositions to the synthesized powders can be combined with a heating step to facilitate the production of new materials. The additional materials can be applied as solutions and/or as powders. For example, silver compounds as powders or as a solution can be added to metal oxide particles, such as vanadium oxide particles. Subsequent heating as described above can result in the production of crystalline silver metal oxide particles, for example silver vanadium oxide particles. During the heating step, any solvent generally is evaporated. The incorporation of silver from a silver salt into vanadium oxide nanoparticles in a heat treatment process is described in copending and commonly assigned U.S. patent application Ser. No. 09/311,506, now U.S. Pat. No. 6,394,494, entitled "Metal Vanadium Oxide Particles," incorporated herein by reference.

The additional processing steps can be performed concurrently with additional particle synthesis or following completion of all particle synthesis. For concurrent production, for example, if one hundred samples are produced at a rate of one sample per minute. If additional processing of the first sample is initiated when the second sample is being produced, the first sample could have received 99 minutes of additional processing by the time that the final sample is produced. Alternatively, all additional processing, such as heat processing, can be performed simultaneously on all of the particle samples.

In alternative embodiments, the compositions are removed from the collectors for further processing. If the collectors are in a linear or two dimensional array, the collectors can be inverted over a corresponding array of tubes of other containers suitable for further processing. Then, the collectors can be physically shaken or vibrated to release the compositions into the tubes. Similarly, liquid can be added to release the product compositions, either powders or liquids, and the resulting liquid mixtures, one for each collected product composition, can be poured into a tube or other suitable container. With the product compositions transferred to separate tubes with or without liquid, the tubes can be handled with automated sample handlers including conventional sample handlers. Additional processing and evaluation can be performed in a systematic, preferably automated, parallel processing of the samples.

Particle Properties

A variety of chemical particles, generally solid particles, can be produced by the methods described herein. Solid particles generally are collected as powders. Chemical powders of particular interest include, for example, carbon particles, silicon particles, metal particles, and metal/metalloid compounds, such as, metal/metalloid oxides, metal/metalloid carbides, metal/metalloid nitrides, metal/metalloid sulfides. Generally, the powders include fine or ultrafine particles with particle sizes in the micron or smaller range.

For some applications, it is desirable to have very uniform particles. Processes using focused radiation are particularly suitable for the formation of highly uniform particles, especially nanoscale particles. In particular, laser pyrolysis can produce a collection of particles of interest generally with an average diameter for the primary particles of less than about 750 nm, preferably from about 3 nm to about 100 nm, more preferably from about 3 nm to about 75 nm, and even more preferably from about 3 nm to about 50 nm. Particle diameters are evaluated by transmission electron microscopy. Diameter measurements on particles with asymmetries are based on an average of length measurements along the principle axes of the particle.

Because of their small size, the primary particles tend to form loose agglomerates due to van der Waals and other electromagnetic forces between nearby particles. These agglomerates can be dispersed to a significant degree, as described further below. The secondary or agglomerated particle size depends on the subsequent processing of the particles following their initial formation and the composition and structure of the particles.

Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

The primary particles preferably can have a high degree of uniformity in size. Laser pyrolysis, as described above, generally results in particles having a very narrow range of particle diameters. Furthermore, heat processing under suitably mild conditions may not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. However, broad distributions of primary particles sizes can also be obtained, if desired, by controlling the flow rates, reactant densities and residence times in laser pyrolysis or using other fluid flow reaction systems.

In highly uniform powders, as determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Similarly, in even more highly uniform powders, the primary particles can have a distribution of diameters such that at least about 95 percent, and preferably 99 percent, of the primary particles have a diameter greater than about 60 percent of the average diameter and less than about 140 percent of the average diameter.

Furthermore, in embodiments with highly uniform particles, effectively no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the particles can have a very high purity level. The nanoparticles produced by the above described methods are expected to have a purity greater than the reactants because the reactions and, when applicable, the crystal formation process tends to exclude contaminants from the particle. Furthermore, crystalline nanoparticles produced by laser pyrolysis have a high degree of crystallinity. Similarly, the crystalline nanoparticles produced by heat processing have a high degree of crystallinity. Impurities on the surface of the particles may be removed by heating the particles to achieve not only high crystalline purity but high purity overall.

Several different types of nanoscale particles have been produced by laser pyrolysis with or without additional heat processing. These particles generally have a very narrow particle size distribution, as described above.

In particular, nanoscale manganese oxide particles have been formed. The production of these particles is described in copending and commonly assigned U.S. patent application Ser. No. 09/188,770, now U.S. Pat. No. 6,506,493 to Kumar et al., entitled "Metal Oxide Particles," incorporated herein by reference. This application describes the production of MnO, $Mn_2O_3$, $Mn_3O_4$ and $Mn_5O_8$.

The production of silicon oxide nanoparticles is described in copending and commonly signed U.S. patent application Ser. No. 09/085,514, now U.S. Pat. No. 6,726,990 to Kumar et al., entitled "Silicon Oxide Particles," incorporated herein by reference. This patent application describes the production of amorphous $SiO_2$. The production of titanium oxide nanoparticles and crystalline silicon dioxide nanoparticles is described in copending and commonly assigned, U.S. patent application Ser. No. 09/123,255 now U.S. Pat. No. 6,387,531 to Bi et al., entitled "Metal (Silicon) Oxide/Carbon Composites," incorporated herein by reference. In particular, this application describes the production of anatase and rutile $TiO_2$. The production of aluminum oxide nanoparticles is described in copending and commonly assigned, U.S. patent application Ser. No. 09/136,483 to Kumar et al., entitled "Aluminum Oxide Particles," incorporated herein by reference. In particular, this application disclosed the production of $\gamma$-$Al_2O_3$.

In addition, tin oxide nanoparticles have been produced by laser pyrolysis, as described in copending and commonly assigned U.S. patent application Ser. No. 09/042,227, now U.S. Pat. No. 6,200,674 to Kumar et al., entitled "Tin Oxide Particles," incorporated herein by reference. The production of zinc oxide nanoparticles is described in copending and commonly assigned U.S. patent application Ser. No. 09/266,202 to Reitz, entitled "Zinc Oxide Particles," incorporated herein by reference. In particular, the production of ZnO nanoparticles is described.

The production of iron, iron oxide and iron carbide is described in a publication by Bi et al., entitled "Nanocrystalline $\alpha$-Fe, $Fe_3C$, and $Fe_7C_3$ produced by $CO_2$ laser pyrolysis," J. Mater. Res. Vol. 8, No 7 1666–1674 (July 1993), incorporated herein by reference. The production of nanoparticles of silver metal is described in copending and commonly assigned U.S. patent application Ser. No. 09/311,506, now U.S. Pat. No. 6,394,494 to Reitz et al., entitled "Metal Vanadium Oxide Particles," incorporated herein by reference. Nanoscale carbon particles produced by laser pyrolysis is described in a reference by Bi et al., entitled "Nanoscale carbon blacks produced by $CO_2$ laser pyrolysis," J. Mater. Res. Vol. 10, No. 11, 2875–2884 (November 1995), incorporated herein by reference.

The production of iron sulfide ($Fe_{1-x}S$) nanoparticles by laser pyrolysis is described in Bi et al., Material Research Society Symposium Proceedings, vol 286, p. 161–166 (1993), incorporated herein by reference. Precursors for laser pyrolysis production of iron sulfide were iron pentacarbonyl ($Fe(CO)_5$) and hydrogen sulfide ($H_2S$).

Cerium oxide can be produced using the laser pyrolysis apparatuses described above. Suitable precursors for aerosol delivery include, for example, cerous nitrate ($Ce(NO_3)_3$), cercus chloride ($CeCl_3$) and cerous oxalate ($Ce_2(C_2O_4)_3$). Similarly, zirconium oxide can be produced using the laser pyrolysis apparatuses described above. Suitable zirconium precursors for aerosol delivery include, for example, zirconyl chloride ($ZrOCl_2$) and zirconyl nitrate ($ZrO(NO_3)_2$).

The production of ternary nanoparticles of aluminum silicate and aluminium titanate can be performed by laser pyrolysis following procedures similar to the production of silver vanadium oxide nanoparticles described in copending and commonly assigned U.S. patent application Ser. No. 09/311,506, now U.S. Pat. No. 6,394,494 to Reitz et al., entitled "Metal Vanadium Oxide Particles," incorporated herein by reference. Suitable precursors for the production of aluminum silicate include, for vapor delivery, a mixture of aluminum chloride ($AlCl_3$) and silicon tetrachloride ($SiCl_4$) and, for aerosol delivery, a mixture of tetra(N-butoxy) silane and aluminum isopropoxide ($Al(OCH(CH_3)_2)_3$). Similarly, suitable precursors for the production of aluminum titanate include, for aerosol delivery, a mixture of aluminum nitrate ($Al(NO_3)_3$) and titanium dioxide ($TiO_2$) powder dissolved in sulfuric acid or a mixture of aluminum isopropoxide and titanium isopropoxide ($Ti(OCH(CH_3)_4)$).

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference.

Particle Evaluation

Potentially, an integral part of the combinatorial synthesis approach involves an evaluation of the resulting materials such that desirable materials can be identified. One or a plurality of evaluations can be performed. The product compositions can be collected in a plurality of individual collectors or in an array of collectors with a fixed arrangement. Suitable properties for evaluation include, for example, crystal structure by x-ray diffraction, surface area (e.g., BET surface area), spectrographic properties, electronic properties, magnetic properties and chemical composition.

To perform the evaluation, the compositions can be removed from the collectors. In other embodiments, the particle evaluation is performed without removing the compositions from the particle collectors. In some of these embodiments, the evaluation of the compositions is performed without removing the particle collectors from the synthesis apparatus, or the evaluation is performed prior to collection within the synthesis apparatus with the compositions within the fluid stream. Of course, some evaluation approaches may not be compatible with evaluation in the collectors or within the synthesis apparatus.

If a plurality of evaluations are performed, the multiple evaluations can be performed with the particles in the same container, either the collector or a different container. Alternatively, the different evaluations can be performed in different containers. Some evaluations, such as chemical reactivity, may irreversibly alter the product. If multiple evaluations are performed where one or more evaluations alter the product, the product must be divided into a plurality of aliquots for separate handling. Of course, it may be convenient to separate the product into different aliquots even if no irreversible evaluations are to be performed.

Figure 15:
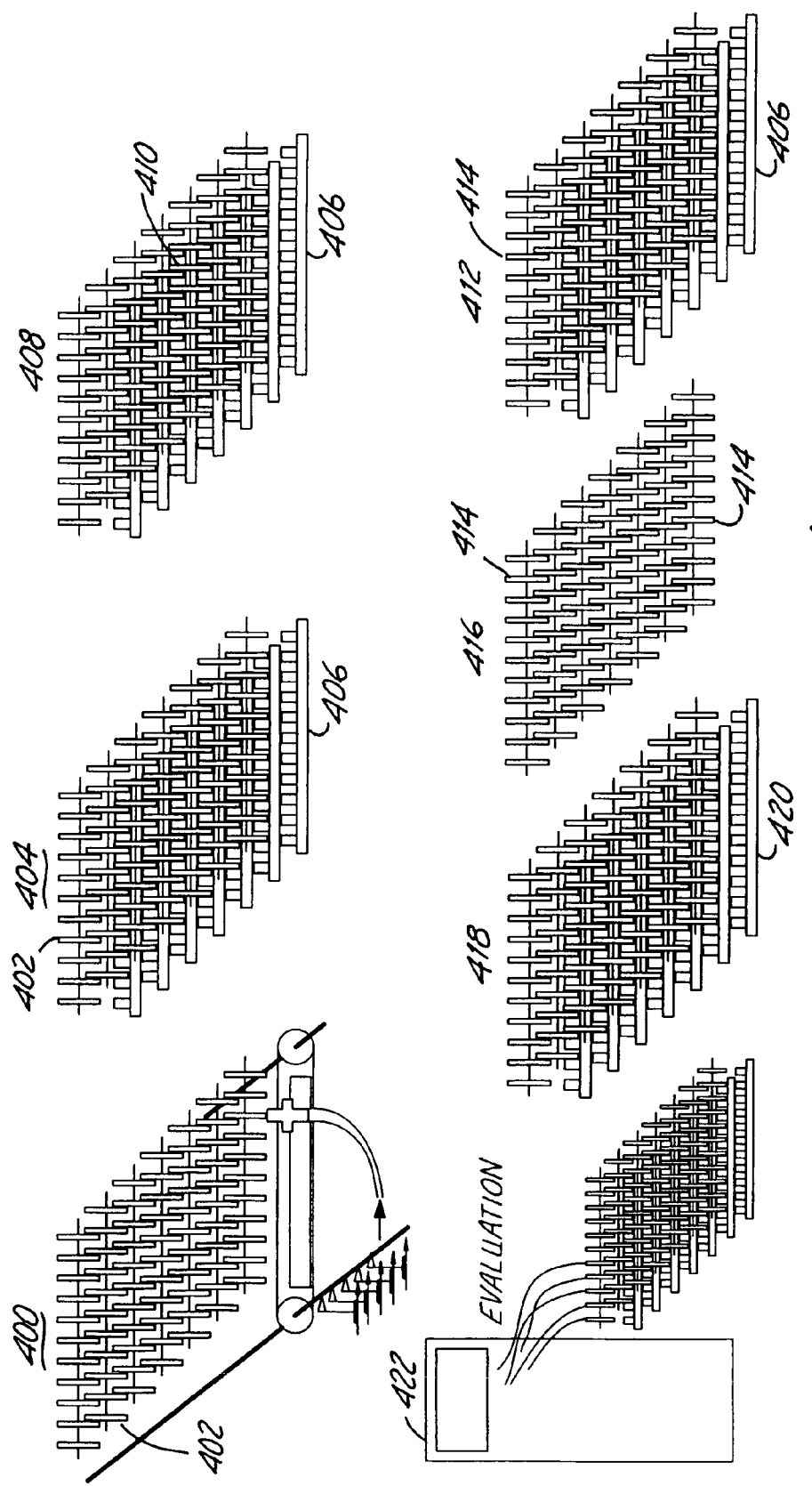
FIG. 15 is a schematic depiction of a parallel processing procedure for measuring the electroactive properties of samples of compositions.

Regardless of how the evaluations are performed, the evaluations preferably are performed systematically with a plurality of samples. An example of systematic processing for testing the electroactive property of a material is shown in FIG. 15. The synthesis process is shown at position 400 where the product compositions are collected in an array of collectors 402. Collectors are moved to a second position 404. Collector array 402 is appropriately positioned over an array or samples holders 406. Shaking or other forces are applied to transfer the samples from a position in collector array 402 to a corresponding position in sample holder 406.

At position 408, a liquid dispenser 410 is used to add a dispersion of electrically conductive particles and a binder in a dispersant/solvent. After adding the liquid, the mixture can be mixed by agitation or other reasonable approach. At position 412, network 414 with sections of nickel metal mesh attached to a non-conducting framework is dip coated with the plurality of mixtures in sample holder 406. At position 416, the dip coated network 414 is dried. The drying can be performed in the air, using an oven or using an alternative heating device, such as a hot air blower. At position 418, network 414 is place with an array of beaker cells 420 such that the coated nickel elements are electrodes within the beaker cells. Performance of each compound as an electroactive material can be evaluated with a battery tester 422.

For particulate products, particle size and particle size distribution can be evaluated by optical scattering by the particles on the stream heading to the collector. Dynamic light scattering is a conventional way of evaluating particle sizes. Suitable commercial particle size analyzers include, for example, a Microtrac UPA instrument from Honeywell based on dynamic light scattering and ZetaSizer Series of instruments from Malvern based on Photon Correlation Spectroscopy.

Optical properties of product compositions can be evaluated within the particle stream going to the collector or within the collector. Relevant optical properties include, for example, emissions by hot particles, absorption of microwave, infrared, visible and/or ultraviolet light, raman scattering and/or fluorescence.

For the performance of dynamic light scattering or the measurement of optical properties within the synthesis apparatus, optical elements, such as lenses, mirrors and optical fibers can be used to deliver light into or out from the apparatus. An embodiment displaying suitable configurations is shown in FIG. 16. Referring to FIG. 16, collector 440 has a tube 442 leading to filter 444. Collector 440 connects with a conduit 446 (shown in phantom lines) leading to a pump.

A first light source 450 connects with tube 442 by way of fiber optic 452. Light source 450 can be a monochromatic or near monochromatic light source, such as a laser or a white light source with a filter or diffraction element, or a broad band light source. Scattering detector 454 leads to tube 442 by way of fiber optic 456. Ports 458, 460, respectively connecting with fiber optics 452, 456 are positioned preferably at approximately right angles along tube 442, such that transmitted light from 452 generally will not strike port 460. Detector 454 preferably includes a processor or is connected to a processor programmed to calculate particle sizes from the light scattering measurements. Alternatively, this arrangement can be used to measure fluorescence or Raman scattering by the particles in the fluid stream.

Second light source 470 directs light toward particles on filter 444 by way of fiber optic 472. Generally, second light source 470 is a broad band light source covering a reasonable portion of a desired frequency range. Detector 474 is connected to a fiber optic 476 that connects with two fiber optic branches 478, 480. Fiber optics 478, 480 connect, respectively, to ports 482, 484. Port 482 is positioned to received emitted, scattered and/or fluoresced light from compositions on filter 444. Port 484 is positioned to receive transmitted light from optical fiber 472 and port 486. The amount of transmitted light is correlated with the amount of absorbed light according to Beer's law, if the amount of absorption is not too great. Detector 474 generally includes diffractive elements, such as a diffraction grating or prism, such that specific wavelengths can be measured. Ports 458, 460, 486, 482, 484 can include optical elements such as lenses.

Crystallinity and composition of crystalline compounds can be evaluated by x-ray scattering. Generally, powders have to be transferred in small quantities to a suitable holder to perform the x-ray diffraction measurement. The holder is placed within an x-ray diffraction instrument to perform the measurement.

Transmission electron micrographs similar involve the transfer of a small quantity of product particles to a special holder used to perform the micrograph measurements. The holder with the sample is placed within a suitable transmission electron micrograph. More accurate measurements of particle sizes, especially, primary particle sizes can be obtained this way. Also, particle morphology can be determined.

The measurement of electroactive properties of materials was described above. Electrical and magnetic properties of material, in principle, can be measured within the collector but in practice this is difficult due to the dispersed nature of the powders on the collector. Thus, it is preferred to remove the materials from the collector for these measurements. Once that particles are removed, conventional measurement approaches can be used. Parallel or simultaneous processing can be used, such as described above for the measurement of electroactive characteristics.

Also, quantities of the product compositions can be used in destructive testing such as chemical reactivity and or elemental composition analysis. Elemental composition can be performed by conventional analytical techniques. Reactivity evaluations depend on the specific reactivity to be evaluated.

Combinatorial Design and Application

Combinatorial synthesis and evaluation provide for the systematic examination of one or more synthesis parameters to determine the value or range of the parameters that correspond with desirable features, as determined by the evaluated property or properties. During a particular combinatorial run, one or more synthesis parameters can be varied. Subsequent runs can be used to obtain more precise values of the same synthesis parameter(s) or to examine other synthesis parameters. In this way, chemical compositions can be developed with improved properties for application to suitable commercial products.

If the reaction parameters are independent with respect to the material's property of interest, the parameters generally would be varied independently to optimize the property. For independent parameters, corresponding independent variation of the parameters is more efficient in terms of smaller numbers of synthesized samples than would be obtained by varying multiple independent parameters simultaneously. If two or more reaction parameters are strongly correlated with respect to the property, it may be efficient to vary the correlated reaction parameters over a grid. Weakly correlated reaction parameters can be evaluated on a grid, or they can be varied over a narrow range and iterated, as described further below.

Referring to FIG. 11, graphically illustrates a single particle synthesis run producing 100 samples with two reaction parameters being varied. Presumably, the reaction parameters are correlated with respect to the property of interest. For example, parameter 1 and parameter 2 can be the flow rate of two different metal precursors. Each point corresponds to one quantity of product particles. The number of samples produced and the number of synthesis parameters being varied can be selected based on the apparatus design. If more than two parameters are varied simultaneously, a three or higher dimensional grid results.

In this hypothetical example, upon evaluation of a property of the resulting particles, it is determined that the particles produced with reaction parameter 1 having the fourth value and reaction parameter 2 having the third value had the best value of an evaluated property or properties. Subsequent to producing the results shown in FIG. 11, the portion of parameter space around P1-4, P2-3 can be examined with greater resolution in a subsequent combinatorial synthesis run, as shown in FIG. 12. According to FIG. 12, a twenty five sample run was performed. By narrowing the parameter range, more accurate values of the synthesis parameters corresponding to desired properties can be obtained. Of course, this refinement process can be generalized as desired, with different numbers of correlated parameters and different numbers of samples produced in each run.

In addition to optimizing correlated synthesis parameters, a third parameter, such as chamber pressure, approximately independent from parameters 1 and 2 can be varied over a range of values. Variation of this third parameter is graphically indicated in FIG. 13 for twelve values of the third parameter. Parameters 1 and 2 can be fixed at optimized values for the variation of the third parameter, although if parameter three is truly independent, the values of parameters 1 and 2 will not effect the results with respect to parameter 3.

For coupled parameters especially weakly coupled parameters, it may be desirable to iterate over ranges of parameters. One or more parameters can be initially varied, holding other parameters fixed, to obtain a optimal value. Then, one or more other parameters can be varied, holding the initially varied parameters at the optimal values. This is continued until all of the synthesis parameter of relevance have been varied. Then, the initially varied parameters can be varied around the initially optimized value holding the other parameters fixed at their optimized values. Due to the correlations and changes in the other synthesis parameters, variation of the initially varied parameters will result in different results in the subsequent runs.

The process can be iterated until the desired accuracy is obtained in synthesis parameters and in the measured property or properties. If desired, nonlinear regression routines, such as Newton's method, can be used to make more accurate predictions of the convergence of the optimized synthesis parameters prior to subsequent combinatorial synthesis runs. Using a systematic variation of the parameters, optimization of the material properties can be performed with the need for the synthesis of fewer samples.

Following various combinations of these approaches, parameter space can be explored to located more desirable materials. The operator determines how many parameters of significance to vary. Similarly, the operator determines the accuracy desired for varying the parameters.

Using the combinatorial synthesis approaches described herein, new compositions or compositions with improved characteristics can be developed in a systematic and efficient manner. With respect to new compositions, the composition of the reactant stream and the synthesis parameters can be varied to yield composition with new stoichiometries. Especially, with solid particle products, wide portions of the phase diagram can be explored with the combinatorial synthesis approach. Similarly, with solid particle products, the synthesis parameters can be varied to change particle sizes, particle shapes, crystallinity, porosity and the like. These particle properties can be themselves properties of interest, or these particle properties can be correlated with other properties of interest, such as electrical, magnetic or optical properties, for particular applications, such as incorporation into devices.

The embodiments described above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. A method for obtaining a plurality of quantities of compositions with an apparatus comprising a plurality of collectors and a nozzle comprising a reactant inlet, the method comprising:
    reacting a first quantity of fluid reactants within a fluid stream comprising gas, vapor, aerosol or a combination thereof, at least a portion of of the reactants is from the reactant inlet, to form a first quantity of product composition;
    collecting the first quantity of product composition from the fluid stream using a first collector;
    moving the nozzle relative to the first collector and second collector following completion of the collection of the first quantity of product composition;
    following completion of the collection of the first quantity of product composition, reacting a second quantity of fluid reactants within the fluid stream at least a portion of which is from the reactant inlet to form a second quantity of product composition, the second quantity of product composition being materially different from the first quantity of product composition; and
    collecting the second quantity of product composition from the fluid stream using a second collector along a flow path independent from the first collector.

2. The method of claim 1 wherein the composition of the second quantity of fluid reactants is different from the composition of the first quantity of fluid reactants.

3. The method of claim 1 wherein a reaction condition during the reaction of the second quantity of fluid reactants is different from the reaction condition during the reaction of the first quantity of fluid reactants.

4. The method of claim 3 wherein the reaction condition is selected from the group consisting of pressure, reactant flux, reactant temperature, amount of inert diluent, amount of radiation absorbing gas, and energy input.

5. The method of claim 1 wherein the nozzle comprises a plurality of reactant inlets.

6. The method of claim 1 wherein the nozzle remains fixed and the collectors are moved relative to the nozzle.

7. The method of claim 1 wherein the collectors remain fixed and the nozzle is moved relative to the collectors.

8. The method of claim 1 wherein the apparatus has a radiation path defined by a radiation source and directing optical elements and wherein the reacting of the fluid reactants involves interacting radiation from the radiation source with the reactants.

9. The method of claim 8 wherein the radiation source is an infrared laser.

10. The method of claim 1 wherein the reactions are performed in a reaction chamber sealed from the ambient environment.

11. The method of claim 10 wherein the compositions comprise particles and the apparatus further comprises a pump and valves, and wherein the valves are opened and closed such that the first collector is exposed to the forces of the pump while the first quantity of particles are being collected and the second collector is exposed to the forces of the pump while the second quantity of particles are being collected.

12. The method of claim 1 further comprising evaluating the properties of the first quantity of product composition and the second quantity of product composition.

13. The method of claim, 1 wherein the first quantity of product composition and the second quantity of product composition comprise solid particles.

14. The method of claim 1 wherein the first quantity of product composition and the second quantity of product composition comprises a metal.

15. The method of claim 1 wherein the first quantity of product composition and the second quantity of product composition comprises chemical powders selected from the group consisting of metal/metalloid oxides, metal/metalloid carbides, metal/metalloid nitrides, and metal/metalloid sulfides.

16. The method of claim 1 wherein the first quantity of fluid reactants and the second quantity of fluid reactants comprise vapor reactants.

17. The method of claim 1 wherein the first quantity of fluid reactants and the second quantity of fluid reactants comprise aerosol reactants.

18. The method of claim 1 wherein first quantity of fluid reactants and the second quantity of fluid reactants comprise a metal/metalloid compound.

19. The method of claim 1 wherein one of the quantity of reactants is introduced into a reaction zone through a plurality of inlets oriented such that the reactants combine after they pass through the inlets, the reaction of the one quantity of reactants taking place within the reaction zone.

20. The method of claim 12 wherein the first quantity of product composition and the second quantity of product composition are solids having a corresponding solid structure and the step of evaluating the properties comprises evaluating the crystal structure by x-ray diffraction.

21. The method of claim 12 wherein the first quantity of product composition and the second quantity of product composition are particulate solids and the step of evaluating the properties comprises evaluating particle size using dynamic light scattering.

22. The method of claim 12 wherein the step of evaluating the properties comprises evaluations of optical properties.

23. The method of claim 22 wherein the optical properties are selected from the group consisting of emission, absorption, Raman scattering, fluorescence and combinations thereof.

24. The method of claim 12 wherein the step of evaluating the properties comprises measurement of electroactive properties.

25. The method of claim 12 wherein the step of evaluating the properties comprises measurement of electrical properties or magnetic properties.

26. The method of claim 12 wherein the step of evaluating the properties is performed without removing the products from the collectors.

27. The method of claim 12 wherein the step of evaluating the properties is performed after removing the products from the collectors.

28. A method for obtaining a plurality of quantities of compositions with an apparatus comprising a plurality of collectors and a reactant delivery system comprising a first quantity of fluid reactants and a second quantity of fluid reactants being different from the first quantity of fluid reactants, the method comprising:

reacting the first quantity of fluid reactants within a fluid stream comprising gas, vapor, aerosol or a combination thereof, to form a first quantity of product composition;

collecting the first quantity of product composition from the fluid stream using a first collector;

following completion of the collection of the first quantity of product composition, reacting the second quantity of fluid reactants within the fluid stream to form a second quantity of product composition, the second quantity of product composition being materially different from the first quantity of product composition, wherein the second quantity of fluid reactant is different from the first quantity of fluid reactants; and collecting the second quantity of product composition from the fluid stream using a second collector.

29. The method of claim 28 wherein the first quantity of fluid reactants comprises a different proportion of compounds relative to the second quantity of fluid reactants.

30. The method of claim 28 wherein the first quantity of fluid reactants comprises different compounds than the second quantity of fluid reactants.

31. The method of claim 28 wherein the apparatus comprises a nozzle comprising a reactant inlet that moves relative to the plurality of collectors and wherein the nozzle is moved relative to the first collector and second collector following completion of the collection of the first quantity of product composition, at least a portion of the first quantity of fluid reactants being from the reactant inlet and at least a portion of the second quantity of second fluid reactants being from the reactant inlet.

32. The method of claim 28 wherein the apparatus has a radiation path defined by a radiation source and directing optical elements and wherein the reacting of the fluid reactants involves interacting radiation from the radiation source with the reactants.

33. The method of claim 28 further comprising evaluating the properties of the first quantity of product composition and the second quantity of product composition.

34. A method for obtaining a plurality of quantities of compositions with an apparatus comprising a plurality of collectors and a reaction chamber isolated from the ambient environment, the method comprising:

reacting in the reaction chamber a first quantity of fluid reactants within a fluid stream comprising gas, vapor, aerosol or a combination thereof, to form a first quantity of product composition;

collecting the first quantity of product composition from the fluid stream using a first collector;

following completion of the collection of the first quantity of product composition, reacting in the reaction chamber a second quantity of fluid reactants within the fluid stream to form a second quantity of product composition, the second quantity of product composition being materially different from the first quantity of product composition, wherein at least one reaction condition during the formation of the second quantity of product compositions is different from the reaction condition during the formation of the first quantity of product compositions and wherein the reaction chamber remains isolated from the ambient environment continuously from the reacting of the first quantity of reactants and through the reacting of the second quantity of reactants; and collecting the second quantity of product composition from the fluid stream using a second collector.

35. The method of claim 34 wherein the at least one reaction condition is selected from the group consisting of pressure, reactant flux, reactant temperature, amount of inert diluent, amount of radiation absorbing gas, and energy input.

36. The method of claim 34 wherein the apparatus comprises a nozzle comprising a reactant inlet that moves relative to the plurality of collectors and wherein the nozzle is moved relative to the first collector and second collector following completion of the collection of the first quantity of product composition, at least a portion of the first quantity of fluid reactants being from the reactant inlet and at least a portion of the second quantity of second fluid reactants being from the reactant inlet.

37. The method of claim 34 wherein the apparatus has a radiation path defined by a radiation source and directing optical elements and wherein the reacting of the fluid reactants involves interacting radiation from the radiation source with the reactants.

38. The method of claim 34 further comprising evaluating the properties of the first quantity of product composition and the second quantity of product.

39. A method for obtaining a plurality of quantities of compositions with an apparatus comprising a plurality of collectors and a nozzle comprising a reactant inlet wherein the apparatus has a radiation path defined by a radiation source and directing optical elements, the method comprising:

reacting a first quantity of fluid reactants within a fluid stream at least a portion of which is from the reactant inlet to form a first quantity of product composition;

collecting the first quantity of product composition from the fluid stream using a first collector;

following completion of the collection of the first quantity of product composition, reacting a second quantity of fluid reactants within the fluid stream at least a portion of which is from the reactant inlet to form a second quantity of product composition, the second quantity of product composition being materially different from the first quantity of product composition; and collecting the second quantity of product composition from the fluid stream using a second collector along a flow path independent from the first collector, wherein the reacting of the fluid reactants involves interacting radiation from the radiation source with the reactants.

40. The method of claim 39 wherein the radiation source is an infrared laser.

41. The method of claim 39 further comprising moving the nozzle relative to the first collector and second collector following completion of the collection of the first quantity of product composition.

42. The method of claim 39 wherein the second quantity of fluid reactant is different from the first quantity of fluid reactants.

43. The method of claim 39 wherein at least one reaction condition during the formation of the second quantity of product compositions is different from the reaction condition during the formation of the first quantity of product compositions.

44. The method of claim 39 wherein the reactions are performed in a reaction chamber sealed from the ambient environment.

45. The method of claim 39 further comprising evaluating the properties of the first quantity of product composition and the second quantity of product composition.

46. The method of claim 39 wherein the first quantity of product composition and the second quantity of product composition comprises a metal.

47. The method of claim 39 wherein the first quantity of fluid reactants and the second quantity of fluid reactants comprise a metal/metalloid compound.

* * * * *

UNITED STATES PATENT AND TRADEMARK OFFICE
CERTIFICATE OF CORRECTION

PATENT NO. : 7,112,449 B1
APPLICATION NO. : 09/557696
DATED : September 26, 2006
INVENTOR(S) : Bi et al.

It is certified that error appears in the above-identified patent and that said Letters Patent is hereby corrected as shown below:

On the Title Page, Item [75], Inventors, delete "Chiruvolo" and insert -- Chiruvolu--.

On the Title Page, Item [73], Assignee, Before "San Jose", insert --2911 Zan ker Road--.

Column 27, line 24, delete "claim, 1" and insert --claim 1--.

Column 27, line 63, delete "evaluations" and insert -- evaluation--.

Signed and Sealed this

Thirteenth Day of November, 2007

JON W. DUDAS
*Director of the United States Patent and Trademark Office*